United States Patent
Nakano

(10) Patent No.: US 9,543,777 B2
(45) Date of Patent: Jan. 10, 2017

(54) POWER SUPPLYING DEVICE AND POWER TRANSMISSION DEVICE

(75) Inventor: Katsuya Nakano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 600 days.

(21) Appl. No.: 13/062,433

(22) PCT Filed: May 7, 2010

(86) PCT No.: PCT/JP2010/058149
§ 371 (c)(1),
(2), (4) Date: Mar. 4, 2011

(87) PCT Pub. No.: WO2010/131728
PCT Pub. Date: Nov. 18, 2010

(65) Prior Publication Data
US 2012/0040613 A1    Feb. 16, 2012

(30) Foreign Application Priority Data

May 13, 2009   (JP) .................................. 2009-117040
Apr. 28, 2010  (JP) .................................. 2010-104234

(51) Int. Cl.
*H04B 17/00* (2006.01)
*H02J 7/02* (2016.01)
(Continued)

(52) U.S. Cl.
CPC ................ *H02J 7/025* (2013.01); *H02J 5/005* (2013.01); *H04B 5/0037* (2013.01); *H04B 5/0093* (2013.01)

(58) Field of Classification Search
CPC ............ H04W 52/245–52/248; H04W 52/267; H02J 7/025; H02J 5/005; H04B 5/0037; H04B 5/0093
(Continued)

(56) References Cited

U.S. PATENT DOCUMENTS 5,311,028 A * 5/1994 Glavish .................. G21K 1/093
                                                250/396 ML
5,393,984 A * 2/1995 Glavish .................. G21K 1/093
                                                250/396 ML
(Continued)

FOREIGN PATENT DOCUMENTS

CN    1912786 A    2/2007
CN    1917331 A    2/2007
(Continued)

OTHER PUBLICATIONS

The above references were cited in a Dec. 21, 2012 Korean Office Action, which is enclosed without English Translation, that issued in Korean Patent Application No. 10-2011-7023371.
(Continued)

*Primary Examiner* — Hai V Nguyen
(74) *Attorney, Agent, or Firm* — Cowan, Liebowitz & Latman, P.C.

(57) ABSTRACT

A power-supplying device supplies the power to a power-supplied device in a non-contact manner, without interfering with communication between the power-supplying device and power-supplied device. More specifically, the power-supplying device supplies the power to the power-supplied device in a non-contact manner, such that the error rate of wireless communication does not increase.

31 Claims, 12 Drawing Sheets

(51) Int. Cl.
*H04B 5/00* (2006.01)
*H02J 5/00* (2016.01)

(58) Field of Classification Search
USPC .................. 455/41.1; 340/505; 370/464–466
See application file for complete search history.

(56) References Cited

U.S. PATENT DOCUMENTS

| | | | | |
|---|---|---|---|---|
| 5,483,077 | A * | 1/1996 | Glavish | G21K 1/093 250/396 R |
| 5,697,081 | A * | 12/1997 | Lyall, Jr. | H04B 1/109 330/149 |
| 5,953,646 | A * | 9/1999 | Hirasawa | H04W 52/0229 340/7.33 |
| 5,963,012 | A * | 10/1999 | Garcia | G01R 31/3648 320/106 |
| 6,052,408 | A * | 4/2000 | Trompower | H04L 1/0003 375/141 |
| 6,104,512 | A * | 8/2000 | Batey, Jr. | H04B 10/1143 340/7.54 |
| 6,243,240 | B1 * | 6/2001 | Ozue | G11B 5/0086 318/640 |
| 6,429,992 | B1 * | 8/2002 | Ozue | G11B 5/0086 360/281.4 |
| 6,490,461 | B1 * | 12/2002 | Muller | H04W 52/12 455/245.1 |
| 6,529,127 | B2 * | 3/2003 | Townsend et al. | 340/505 |
| 6,553,018 | B1 * | 4/2003 | Ichihara | H04W 52/362 370/335 |
| 6,708,041 | B1 * | 3/2004 | Butovitsch | H04W 52/40 370/318 |
| 6,788,486 | B1 * | 9/2004 | Sakai | 360/69 |
| 6,816,393 | B2 * | 11/2004 | Miyamoto | 363/21.17 |
| 6,856,812 | B1 * | 2/2005 | Budka | H04W 52/20 370/318 |
| 6,885,847 | B1 * | 4/2005 | Lumelsky | H04W 88/02 370/328 |
| 6,900,697 | B1 * | 5/2005 | Doyle | H03F 1/0222 330/296 |
| 6,907,018 | B1 * | 6/2005 | Paranchych | H04W 52/267 370/332 |
| 6,977,551 | B2 * | 12/2005 | Ichitsubo | H01L 23/66 330/129 |
| 7,003,331 | B2 * | 2/2006 | Cromer | H04W 52/0261 370/208 |
| 7,027,773 | B1 * | 4/2006 | McMillin | 455/41.2 |
| 7,035,664 | B2 * | 4/2006 | Kim | H04W 88/06 455/101 |
| 7,073,080 | B2 * | 7/2006 | Lou | G06F 1/3203 398/197 |
| 7,106,700 | B2 * | 9/2006 | Freiberg | H04L 1/0002 370/252 |
| 7,180,404 | B2 * | 2/2007 | Kunerth | G01L 19/083 340/10.41 |
| 7,216,243 | B2 * | 5/2007 | Chou | G06F 1/3203 713/300 |
| 7,277,679 | B1 * | 10/2007 | Barratt | H04B 7/084 375/347 |
| 7,292,412 | B2 * | 11/2007 | Suzuki et al. | 360/281.1 |
| 7,301,289 | B2 * | 11/2007 | Okamoto et al. | 315/291 |
| 7,307,521 | B2 * | 12/2007 | Funk | G01N 33/0073 340/539.1 |
| 7,321,787 | B2 * | 1/2008 | Kim | H04L 12/12 455/254 |
| 7,330,729 | B2 * | 2/2008 | Niwa | H04M 1/72522 340/988 |
| 7,333,563 | B2 * | 2/2008 | Chan | H04W 52/343 375/297 |
| 7,400,911 | B2 * | 7/2008 | Planning | H01M 10/465 320/101 |
| 7,450,910 | B2 * | 11/2008 | Aoki | G05F 1/70 323/205 |
| 7,502,594 | B2 * | 3/2009 | Ginggen et al. | 455/69 |
| 7,529,528 | B2 * | 5/2009 | Uratani | H03F 1/0205 455/127.1 |
| 7,555,063 | B2 * | 6/2009 | Sadahiro | H04L 1/0002 375/316 |
| 7,565,152 | B2 * | 7/2009 | Gandhi | H04W 28/12 455/452.1 |
| 7,570,975 | B2 * | 8/2009 | Oprescu-Surcobe | H04W 52/0225 340/7.32 |
| 7,653,394 | B2 * | 1/2010 | McMillin | 455/444 |
| 7,701,965 | B2 * | 4/2010 | Ihori | 370/464 |
| 7,733,215 | B2 | 6/2010 | Kozuma et al. | |
| 7,738,902 | B2 * | 6/2010 | Murata | H04W 52/12 370/318 |
| 7,760,795 | B2 * | 7/2010 | Yano et al. | 375/225 |
| 7,793,172 | B2 * | 9/2010 | Bruce | G11C 5/147 714/708 |
| 7,801,099 | B2 * | 9/2010 | Desai | H04W 52/267 370/338 |
| 7,805,112 | B2 * | 9/2010 | Ginggen et al. | 455/69 |
| 7,821,410 | B2 * | 10/2010 | Higashionji | A61M 5/14 340/572.1 |
| 7,852,053 | B2 * | 12/2010 | Martin | H02M 3/1584 323/272 |
| 7,860,680 | B2 * | 12/2010 | Arms | H02J 17/00 702/127 |
| 7,933,293 | B2 * | 4/2011 | Wentink | H04B 7/2126 342/359 |
| 7,986,481 | B2 * | 7/2011 | Yamanaka | G11B 5/02 360/31 |
| 8,059,571 | B2 * | 11/2011 | Sen | H04W 28/18 370/311 |
| 8,098,684 | B2 * | 1/2012 | Schopfer et al. | 370/465 |
| 8,126,433 | B2 * | 2/2012 | Haartsen | H04B 5/0025 455/41.1 |
| 8,129,942 | B2 | 3/2012 | Park et al. | |
| 8,131,214 | B2 * | 3/2012 | Braun | H04M 1/7253 455/41.1 |
| 8,140,010 | B2 * | 3/2012 | Symons | H04B 5/0075 455/41.1 |
| 8,165,642 | B2 * | 4/2012 | Dimpflmaier | H03F 1/0211 455/572 |
| 8,169,185 | B2 * | 5/2012 | Partovi et al. | 320/108 |
| 8,195,103 | B2 * | 6/2012 | Waheed | H04B 1/0475 455/114.3 |
| 8,282,009 | B2 * | 10/2012 | Ahn | G06K 7/0004 235/487 |
| 8,290,085 | B2 * | 10/2012 | Chan | H04W 52/343 375/297 |
| 8,295,764 | B2 * | 10/2012 | Rhodes | H04B 5/00 340/572.8 |
| 8,311,155 | B2 * | 11/2012 | Umeda | H04B 1/30 375/316 |
| 8,320,885 | B2 * | 11/2012 | Haartsen | H04B 5/0025 455/41.1 |
| 8,355,748 | B2 * | 1/2013 | Abe | H04W 16/14 370/329 |
| 8,373,386 | B2 * | 2/2013 | Baarman | H02J 5/005 320/104 |
| 8,463,394 | B2 * | 6/2013 | Forsell | H02J 5/005 607/61 |
| 8,482,157 | B2 * | 7/2013 | Cook et al. | 307/104 |
| 8,525,370 | B2 * | 9/2013 | Walley et al. | 307/104 |
| 8,527,786 | B2 * | 9/2013 | Nakano | G06F 1/26 713/300 |
| 8,571,486 | B2 * | 10/2013 | Gasperi et al. | 455/67.7 |
| 8,581,444 | B2 * | 11/2013 | Urano | H02J 5/005 307/104 |
| 8,618,696 | B2 * | 12/2013 | Kurs | B60L 3/0069 307/104 |
| 8,621,126 | B2 * | 12/2013 | Sueyoshi | H04B 5/0031 455/41.1 |
| 8,629,576 | B2 * | 1/2014 | Levine | H02J 5/005 307/104 |
| 8,660,535 | B2 * | 2/2014 | Haartsen | H04B 5/0025 455/411 |

(56) References Cited

U.S. PATENT DOCUMENTS

| | | | | |
|---|---|---|---|---|
| 8,680,715 B2* | 3/2014 | Tanabe | H01M 10/44 | 307/104 |
| 8,798,571 B2* | 8/2014 | Shih | G06F 1/325 | 370/311 |
| 8,805,386 B2* | 8/2014 | Cho | H04L 45/46 | 370/329 |
| 8,817,651 B2* | 8/2014 | Yu | H04L 5/0048 | 370/252 |
| 8,829,727 B2* | 9/2014 | Urano | H02J 5/005 | 307/104 |
| 8,836,279 B2* | 9/2014 | Nakano | H02J 7/025 | 320/108 |
| 8,854,656 B2* | 10/2014 | Hagiuda | G03G 15/5004 | 358/1.14 |
| 8,987,659 B2* | 3/2015 | Laurence | G01T 1/1648 | 250/252.1 |
| 8,989,659 B2* | 3/2015 | Akita | H04B 5/0031 | 455/41.1 |
| 9,026,168 B2* | 5/2015 | Lyon | H04W 52/248 | 455/11.1 |
| 9,031,502 B2* | 5/2015 | Smith | H04B 5/0075 | 455/41.1 |
| 9,124,121 B2* | 9/2015 | Ben-Shalom | H02J 7/025 | |
| 9,197,143 B1* | 11/2015 | Townsend | H02N 2/181 | |
| 9,301,337 B2* | 3/2016 | Brown | H04B 5/02 | |
| 2002/0094836 A1 | 7/2002 | Nakamura | H04W 52/12 | 455/522 |
| 2002/0176513 A1* | 11/2002 | Gouessant | H04W 52/52 | 375/297 |
| 2003/0023540 A2* | 1/2003 | Johnson | G06Q 10/04 | 705/37 |
| 2003/0038897 A1* | 2/2003 | Shiotsu | H04B 7/082 | 348/725 |
| 2003/0129978 A1* | 7/2003 | Akiyama | H04B 3/54 | 455/426.1 |
| 2004/0025065 A1* | 2/2004 | Lou | G06F 1/3203 | 713/300 |
| 2004/0076021 A1* | 4/2004 | Miyamoto | 363/21.01 | |
| 2004/0141460 A1* | 7/2004 | Holtzman | H04L 1/0006 | 370/216 |
| 2004/0205365 A1* | 10/2004 | Chou | G06F 1/3203 | 713/323 |
| 2004/0242149 A1* | 12/2004 | Luneau | H04K 3/45 | 455/1 |
| 2004/0259584 A1* | 12/2004 | Murata | H04W 52/12 | 455/522 |
| 2005/0068009 A1* | 3/2005 | Aoki | 323/205 | |
| 2005/0117661 A1* | 6/2005 | Kim | H04L 1/0026 | 375/302 |
| 2005/0140482 A1* | 6/2005 | Cheng et al. | 336/180 | |
| 2005/0226201 A1* | 10/2005 | McMillin | 370/348 | |
| 2005/0227723 A1* | 10/2005 | Lee | H04W 52/04 | 455/522 |
| 2005/0254647 A1* | 11/2005 | Anandakumar | G06F 1/3203 | 380/42 |
| 2005/0286422 A1* | 12/2005 | Funato | H04L 29/06027 | 370/235 |
| 2006/0046668 A1* | 3/2006 | Uratani | H03F 1/0205 | 455/127.5 |
| 2006/0079265 A1* | 4/2006 | Masuda | H04W 52/343 | 455/522 |
| 2006/0084417 A1* | 4/2006 | Melpignano | H04L 12/5692 | 455/418 |
| 2006/0103534 A1* | 5/2006 | Arms | E01F 13/12 | 340/572.1 |
| 2006/0103730 A1* | 5/2006 | Jung | H04N 5/23203 | 348/207.99 |
| 2006/0128318 A1* | 6/2006 | Agarossi | H04L 1/0003 | 455/69 |
| 2006/0172782 A1* | 8/2006 | Planning | H01M 10/465 | 455/572 |
| 2006/0209892 A1* | 9/2006 | MacMullan | H04N 5/775 | 370/468 |
| 2006/0268789 A1* | 11/2006 | Yu | H04W 52/38 | 370/335 |
| 2007/0018833 A1* | 1/2007 | Higashionji | B41J 3/44 | 340/572.7 |
| 2007/0021140 A1* | 1/2007 | Keyes | H02J 17/00 | 455/522 |
| 2007/0032098 A1* | 2/2007 | Bowles | H01M 10/46 | 439/11 |
| 2007/0099613 A1* | 5/2007 | Burgan et al. | 455/435.2 | |
| 2007/0133493 A1* | 6/2007 | Maruhashi | H04B 7/04 | 370/342 |
| 2007/0139000 A1* | 6/2007 | Kozuma et al. | 320/108 | |
| 2007/0189242 A1* | 8/2007 | Hosokawa | H04B 10/1149 | 370/338 |
| 2007/0224951 A1* | 9/2007 | Gilb | H01Q 3/26 | 455/127.5 |
| 2007/0232344 A1* | 10/2007 | Aoki | H04B 7/0874 | 455/522 |
| 2008/0043773 A1* | 2/2008 | Ihori | H04W 28/18 | 370/460 |
| 2008/0091990 A1* | 4/2008 | Bruce | G11C 5/147 | 714/721 |
| 2008/0117117 A1* | 5/2008 | Washiro | H01Q 1/2225 | 343/850 |
| 2008/0151798 A1* | 6/2008 | Camp | H04B 1/1615 | 370/311 |
| 2008/0157743 A1* | 7/2008 | Martin | H02M 3/1584 | 323/284 |
| 2008/0184345 A1* | 7/2008 | Kaechi | 726/5 | |
| 2008/0211455 A1 | 9/2008 | Park et al. | | |
| 2008/0237355 A1* | 10/2008 | Ahn | G06K 7/0004 | 235/492 |
| 2008/0299927 A1* | 12/2008 | Tenbrook | H04W 48/16 | 455/226.2 |
| 2009/0003481 A1* | 1/2009 | Schopfer | H04B 3/542 | 375/260 |
| 2009/0004981 A1* | 1/2009 | Eliezer | H03F 1/0211 | 455/127.1 |
| 2009/0015419 A1* | 1/2009 | Sewall | H04L 43/0817 | 340/644 |
| 2009/0029652 A1* | 1/2009 | Xie | H04W 52/0245 | 455/69 |
| 2009/0088077 A1* | 4/2009 | Brown | H04B 5/02 | 455/41.2 |
| 2009/0103435 A1* | 4/2009 | Celentano | H04W 28/22 | 370/232 |
| 2009/0168734 A1* | 7/2009 | Cho | H01Q 1/084 | 370/338 |
| 2009/0175255 A1* | 7/2009 | Akiyama | H04W 52/0251 | 370/338 |
| 2009/0181681 A1* | 7/2009 | Hammond | H04W 36/32 | 455/440 |
| 2009/0197543 A1* | 8/2009 | Rofougaran | 455/73 | |
| 2009/0212761 A1* | 8/2009 | Ohta et al. | 324/76.11 | |
| 2009/0215397 A1* | 8/2009 | Thorn | G06F 1/1626 | 455/41.2 |
| 2009/0219863 A1* | 9/2009 | Sen | H04W 28/18 | 370/329 |
| 2009/0243394 A1* | 10/2009 | Levine | H02J 5/005 | 307/104 |
| 2009/0275293 A1* | 11/2009 | Ida | H04B 13/005 | 455/73 |
| 2009/0276639 A1* | 11/2009 | Saha | H02M 3/156 | 713/300 |
| 2009/0312005 A1* | 12/2009 | Mukundan | H04L 1/0002 | 455/422.1 |
| 2010/0015918 A1* | 1/2010 | Liu et al. | 455/41.1 | |
| 2010/0029317 A1* | 2/2010 | Budampati et al. | 455/522 | |
| 2010/0068996 A1* | 3/2010 | Haartsen | H04B 5/0025 | 455/41.1 |
| 2010/0069005 A1* | 3/2010 | Haartsen | H04B 1/109 | 455/41.3 |
| 2010/0217553 A1* | 8/2010 | Von Novak | H04B 5/0056 | 702/65 |

(56) References Cited

U.S. PATENT DOCUMENTS

| | | | | |
|---|---|---|---|---|
| 2011/0092164 | A1* | 4/2011 | Spanhake | H04Q 9/00 455/67.11 |
| 2011/0136550 | A1* | 6/2011 | Maugars | H02J 7/025 455/573 |
| 2011/0217927 | A1* | 9/2011 | Ben-Shalom | H02J 7/025 455/41.1 |
| 2011/0244794 | A1* | 10/2011 | Nakano | H02J 7/025 455/41.1 |
| 2011/0248846 | A1* | 10/2011 | Belov | H04Q 9/00 340/539.1 |
| 2011/0264297 | A1* | 10/2011 | Nakano | G06F 1/26 700/297 |
| 2012/0114052 | A1* | 5/2012 | Haartsen | H04B 5/0025 375/259 |
| 2012/0223589 | A1* | 9/2012 | Low | H04B 5/0037 307/104 |
| 2013/0015249 | A1* | 1/2013 | Ahn | G06K 7/0004 235/492 |
| 2013/0044793 | A1* | 2/2013 | Haartsen | H04B 5/0025 375/219 |
| 2013/0235757 | A1* | 9/2013 | Wang | H04L 67/12 370/254 |
| 2013/0260677 | A1* | 10/2013 | Partovi | 455/41.1 |
| 2013/0266154 | A1* | 10/2013 | McCormack et al. | 381/117 |
| 2013/0285455 | A1* | 10/2013 | Hunter | H02J 7/0044 307/66 |
| 2014/0146704 | A1* | 5/2014 | Cho | H04L 45/46 370/254 |
| 2016/0006343 | A1* | 1/2016 | Terada | H02J 17/00 307/104 |
| 2016/0156873 | A1* | 6/2016 | Toye | H04N 5/63 348/453 |
| 2016/0234631 | A1* | 8/2016 | Brown | H04B 5/02 |

FOREIGN PATENT DOCUMENTS

| | | |
|---|---|---|
| CN | 101233666 A | 7/2008 |
| JP | 09-103037 A | 4/1997 |
| JP | 11-098706 A | 4/1999 |
| JP | 11-168837 A | 6/1999 |
| JP | 2005-110399 A | 4/2005 |
| JP | 2005-192392 A | 7/2005 |
| JP | 2006-081249 A | 3/2006 |
| JP | 2006-211050 A | 8/2006 |
| JP | 2006-246633 A | 9/2006 |
| JP | 2006-314181 A | 11/2006 |
| JP | 2006-352660 A | 12/2006 |
| JP | 2007-089341 A | 4/2007 |
| JP | 2007-148564 A | 6/2007 |
| JP | 2008-206297 A | 9/2008 |
| KR | 10-2007-0015264 A | 2/2007 |
| WO | 2005/109597 A1 | 11/2005 |

OTHER PUBLICATIONS

The above references were cited in a May 6, 2013 Chinese Office Action, which is enclosed with an English Translation, that issued in Chinese Patent Application No. 201080004158.6.

The above references were cited in a Supplementary European Search Report issued on Aug. 14, 2013, which is not enclosed, that issued in the corresponding European Patent Application No. 10774980.6.

The above references were cited in a Aug. 30, 2013 European Search Report which is enclosed of the counterpart European Patent Application No. 10774985.5.

* cited by examiner

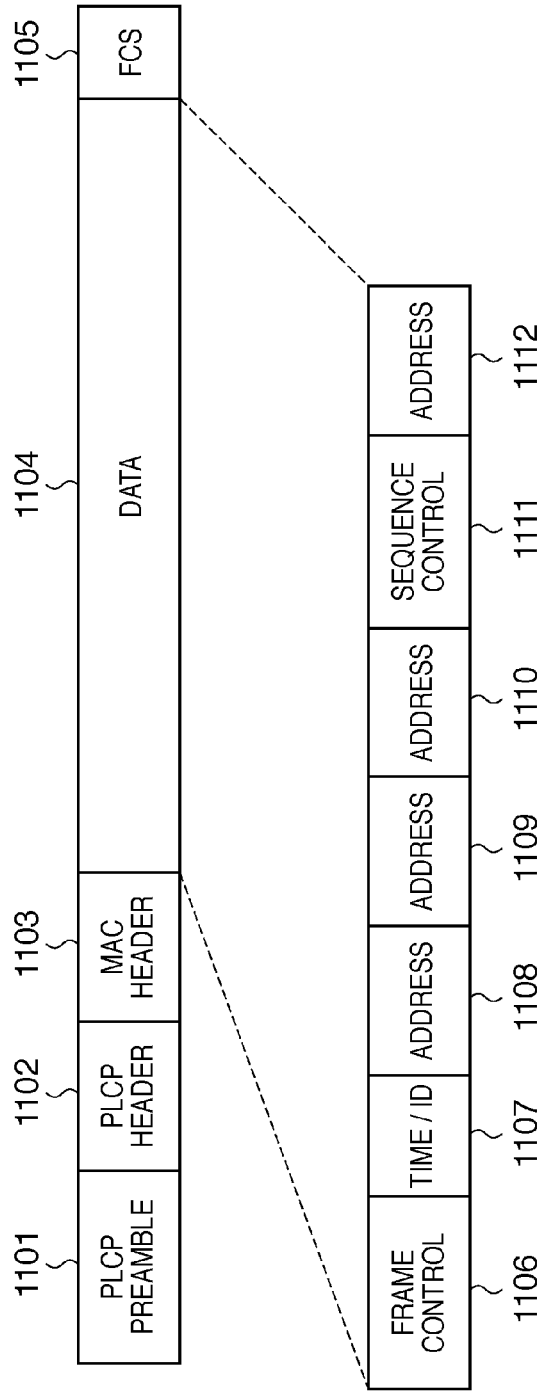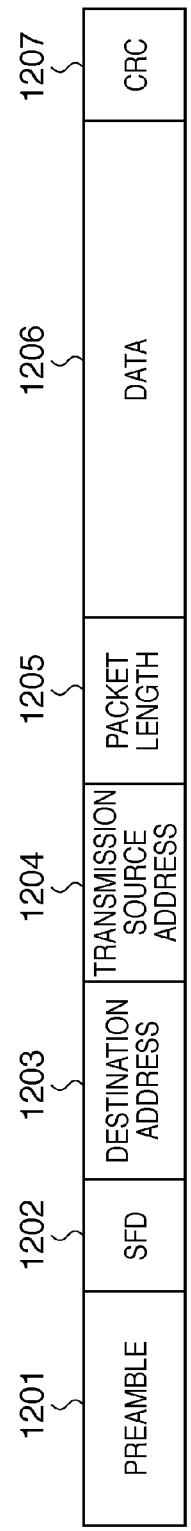

F I G. 14

1400

| COIL NUMBER | EXISTENCE OF EXTERNAL DEVICE | SUPPLYING POWER | SESSION ESTABLISHMENT |
|---|---|---|---|
| 1 | YES | YES | NO |
| 2 | YES | YES | NO |
| 3 | NO | N/A | N/A |
| 4 | YES | NO | YES |
| 5 | YES | YES | YES |
| ... | ... | ... | ... |
| 30 | NO | N/A | N/A |

POWER SUPPLYING DEVICE AND POWER TRANSMISSION DEVICE

CROSS-REFERENCE TO RELATED APPLICATIONS

This application is a national stage application of International Application No. PCT/JP2010/058149, filed May 7, 2010, whose benefit is claimed and which claims the benefit of Japanese Patent Application No. 2009-117040, filed May 13, 2009 and 2010-104234, filed Apr. 28, 2010, whose benefit is also claimed.

TECHNICAL FIELD

The present invention relates to a power-supplying device, a control method of the same, and a power supply system.

BACKGROUND ART

Conventionally, some apparatuses such as an electric shaver and electric toothbrush are supplied power in a non-contact manner by a cradle or the like using electromagnetic induction. Japanese Patent Laid-Open No. 11-98706 has disclosed a method by which a power-supplied device on the main body side includes a secondary coil, and a power-supplying device for supplying power to the power-supplied device includes a primary coil and generates a high-frequency, alternating-current magnetic flux, thereby supplying power by transmitting power to the power-supplied device by using electromagnetic induction.

In the above-mentioned prior art, however, when the power-supplying device has a wireless communication function and wirelessly communicates with the power-supplied device, a variation of magnetic field such as the alternating-current magnetic flux generated on the primary coil in order to supply power affects the wireless communication, and this may decrease the communication rate.

SUMMARY OF INVENTION

The present invention has been made in consideration of the problem of the prior art as described above. The present invention provides a power-supplying device supplying power to a power-supplied device by using electromagnetic induction, magnetic field resonance, or magnetic resonance without interfering with wireless communication performed by the power-supplying device.

The present invention in its first aspect provides a power-supplying device comprising: power supply means for supplying power to a power-supplied device in a non-contact manner; communicating means for wirelessly communicating with an external device; detecting means for detecting an error rate of communication performed by the communicating means; and control means for controlling the power supply means to supply the power to the power-supplied device, such that the error rate detected by the detecting means does not increase.

Further features of the present invention will become apparent from the following description of exemplary embodiments with reference to the attached drawings.

BRIEF DESCRIPTION OF DRAWINGS

FIG. 11 is a view showing the frame configuration of a wireless LAN;

FIG. 12 is a view showing the frame configuration of the Ethernet;

FIG. 14 is a view showing an external device management table of the power-supplying device according to the embodiment.

DESCRIPTION OF EMBODIMENTS

Although embodiments of the present invention will be explained below with reference to the accompanying drawings, the present invention is not limited to the following embodiments. Also, the embodiments of the present invention disclose preferred forms of the invention, and do not limit the scope of the invention.

Figure 1:
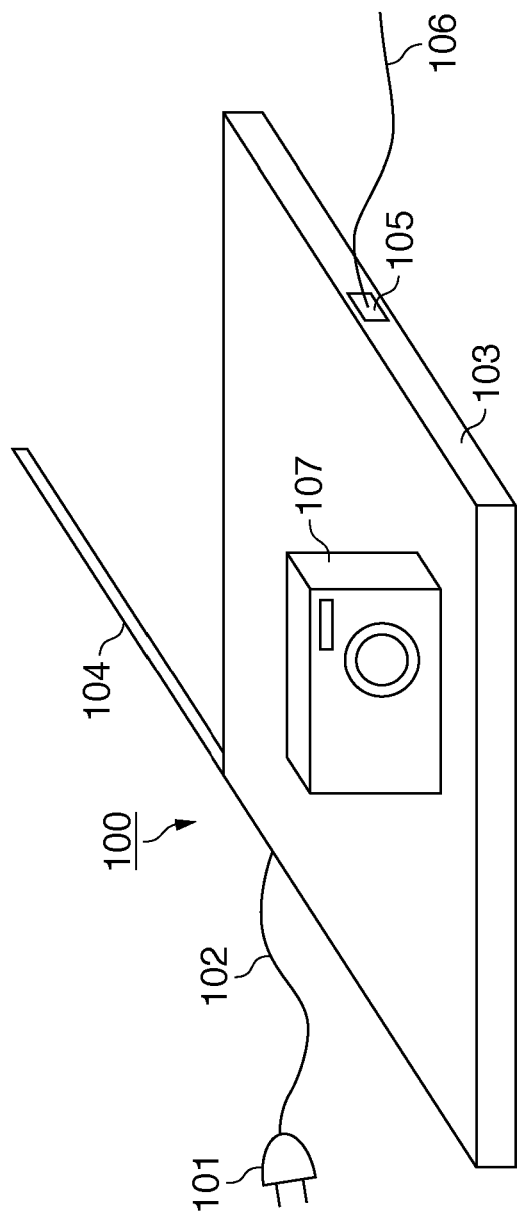
FIG. 1 is a view showing the configuration of a power supply communication system including a power-supplying device according to an embodiment.

FIG. 1 is a view showing the configuration of a power supply communication system including a power-supplying device 100 according to this embodiment. As shown in FIG. 1, the power supply communication system includes the power-supplying device 100, and an external device 107 as targets of power supply and communication from the power-supplying device 100.

The power-supplying device 100 includes a power plug 101 and power cable 102 for receiving the commercial power supply, a main body 103, a wireless communication antenna 104 for wirelessly communicating with the external device, and a LAN connector 105 and LAN cable 106 for connecting to an external network. The power-supplying device 100 receives an AC power supply at, for example, a commercial power supply frequency (e.g., 50 or 60 Hz) by the power plug 101 and power cable 102, and supplies an electric current to a primary coil for non-contact power supply contained in the main body 103 by electric power supplied by the AC power supply, thereby generating an oscillating magnetic flux. The external device 107 as a power supply target placed on the main body 103 contains a secondary coil for receiving power. In this power supply communication system, therefore, non-contact power supply is performed from the power-supplying device 100 to the external device 107 placed close to the power-supplying device 100 by using electromagnetic induction. More specifically, non-contact power supply is performed for the external device 107 placed in a power supply range within which a primary coil 204 (to be described later) can supply power. This embodiment uses an electromagnetic induction method as a method of non-contact power supply. However, it is possible to use any method such as a magnetic field resonance method (magnetic resonance method), provided that electric power is generated on a coil of a power-supplied device by a magnetic field (magnetic force) generated from a coil of a power-supplying device, thereby performing non-contact power supply.

Also, the external device 107 has a wireless communication function, and can wirelessly communicate with the power-supplying device 100 via the wireless communication antenna 104. Furthermore, the external device 107 can also communicate with an external network via the LAN connector 105 and LAN cable 106 of the power-supplying device 100 to which the external device 107 connects by wireless communication. Note that the external device 107 is not limited to a camera as shown in FIG. 1 and can be any device as long as the device includes at least a secondary coil and is a target of power supply from the power-supplying device 100. Note that the external device as a power supply target will simply be called a power-supplied device in the following explanation.

Figure 2:
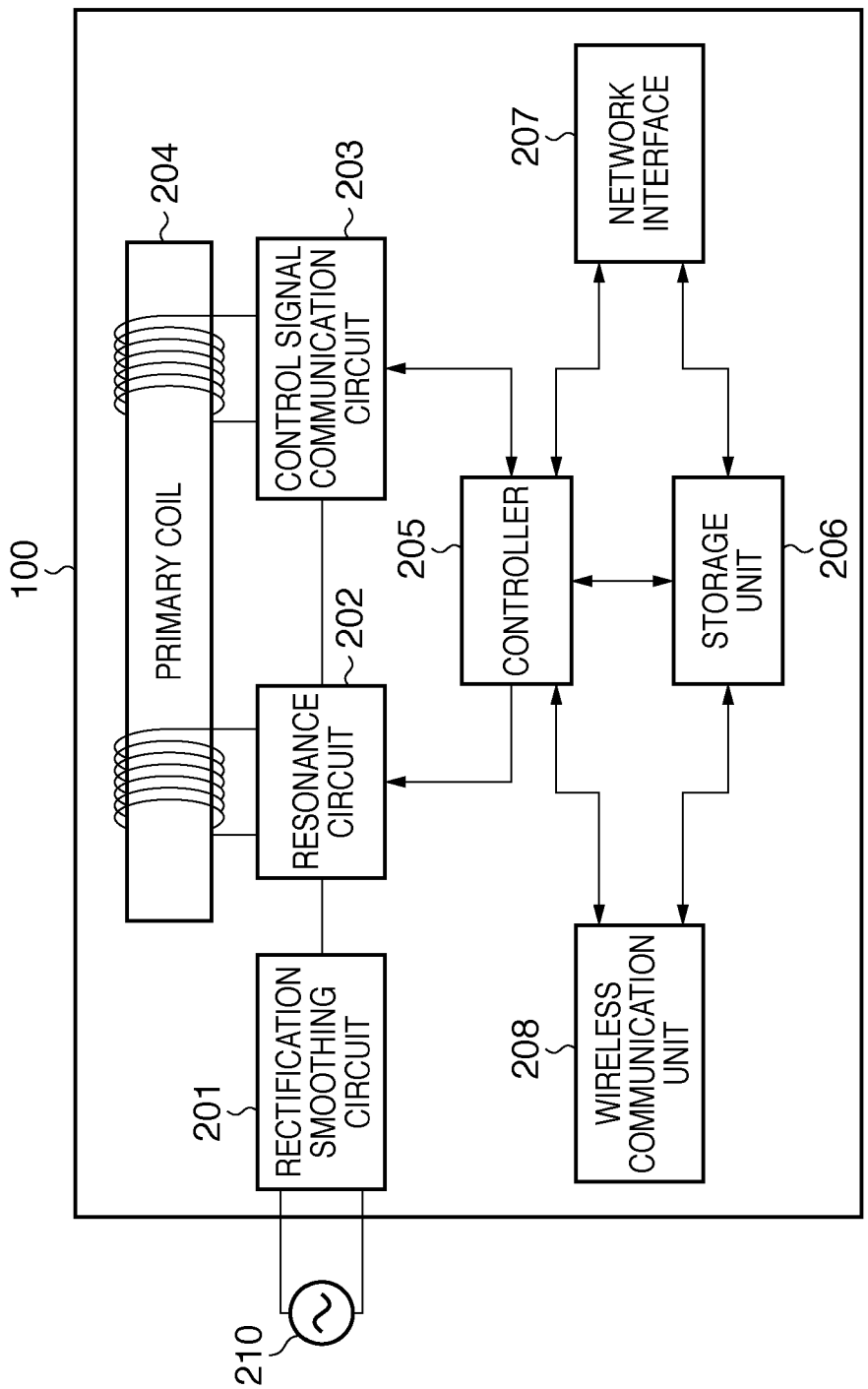
FIG. 2 is a block diagram showing the internal configuration of the power-supplying device according to the embodiment.

FIG. 2 is a block diagram showing the internal configuration of the power-supplying device 100. As shown in FIG. 2, the power-supplying device 100 includes a rectification smoothing circuit 201, a resonance circuit 202, a control signal communication circuit 203, the primary coil 204, a controller 205, a storage unit 206, a network interface 207, and a wireless communication unit 208.

The rectification smoothing circuit 201 includes a rectification circuit for converting the AC power at the commercial power supply frequency received via the power plug 101 and power cable 102 into DC power, and a smoothing circuit for removing a large amount of pulsing component contained in addition to the DC component of the rectified output voltage. The power-supplying device 100 can convert the AC power from a commercial power supply 210 into DC power by the rectification smoothing circuit 201.

Based on the DC power supplied from the rectification smoothing circuit 201, the resonance circuit 202 oscillates in a high frequency for causing the primary coil 204 to generate an oscillating magnetic flux for power transmission to the power-supplied device. Also, in response to instructions from the controller 205, the resonance circuit 202 adjusts the DC power amount (current amount) to be supplied to the primary coil 204, thereby controlling the intensity of the oscillating magnetic flux to be generated by the primary coil 204. This embodiment supplies power to the power-supplied device including the secondary coil by using the oscillating magnetic flux generated here.

The control signal communication circuit 203 causes the primary coil 204 to generate an oscillating magnetic flux for signal communication in response to instructions from the controller 205. The secondary coil of the power-supplied device receives the oscillating magnetic flux for signal communication generated by the primary coil 204, and a circuit for analyzing the change pattern of an electromotive force generated by the oscillating magnetic flux analyzes the contents of the signal. More specifically, the control signal communication circuit 203 causes the primary coil 204 to generate an oscillating magnetic flux by superposing information regarding the oscillation pattern (magnetic flux variation pattern) of the magnetic flux for signal communication. Alternatively, the control signal communication circuit 203 causes the primary coil 204 to generate a magnetic flux variation pattern predetermined on the transmitting side and receiving side. Also, the control signal communication circuit 203 performs transmission at a frequency different from that of the resonance circuit 202, in order to prevent the oscillating magnetic flux for power supply generated by the primary coil 204 from interfering with the oscillating magnetic flux for control signal communication to break down the control signal communication. The control signal communication circuit 203 can also receive a signal transmitted from the power-supplied device by detecting the change pattern (electromotive force pattern) of the electromotive force generated on the primary coil 204 by using the oscillating magnetic flux for signal communication generated by the secondary coil of the power-supplied device.

The primary coil 204 can generate the oscillating magnetic fluxes for power transmission and signal communication under the control of the resonance circuit 202 and control signal communication circuit 203. The primary coil 204 can also generate an electromotive force by the oscillating magnetic flux for signal communication generated on the secondary coil of the power-supplied device, and supply the electromotive force to the control signal communication circuit 203.

The controller 205 is, for example, a CPU (Central Processing Unit) or microcontroller, and controls the individual units of the power-supplying device 100 by sequentially executing program codes stored in the storage unit 206 or the like. More specifically, the controller 205 controls the resonance circuit 202 and control signal communication circuit 203. The controller 205 also controls network communication with the external network performed via the network interface 207. Furthermore, the controller 205 controls wireless communication with the external device performed via the wireless communication unit 208.

The storage unit 206 stores, for example, the program codes to be executed by the controller 205, and the setting information of the power-supplying device 100. The storage unit 206 also provides a work area where the controller 205 executes the program codes. For example, the work area of the storage unit 206 stores frame data for network communication using the network interface 207, and data packets for wireless communication using the wireless communication unit 208.

The network interface 207 connects the power-supplying device 100 to the external network under the control of the controller 205, and includes, for example, the LAN connector 105, an Ethernet PHY (not shown), and an Ethernet controller (not shown). When communicating with the external network, the network interface 207 communicates normal TCP/IP data packets as Ethernet frame data.

The wireless communication unit 208 wirelessly communicates with the external device under the control of the controller 205. Although the wireless communication method performed by the wireless communication unit 208 is not particularly limited, this embodiment uses a wireless LAN of the IEEE802.11 series. The external device communicates with the power-supplying device 100 via the wireless communication unit 208 across the wireless LAN, and communicates with the external network (LAN) by using the network interface 207. That is, power-supplying device 100 functions as a hub. The wireless communication unit 208 of this embodiment can also communicate with a power-supplied device including a wireless communication unit.

Figure 3:
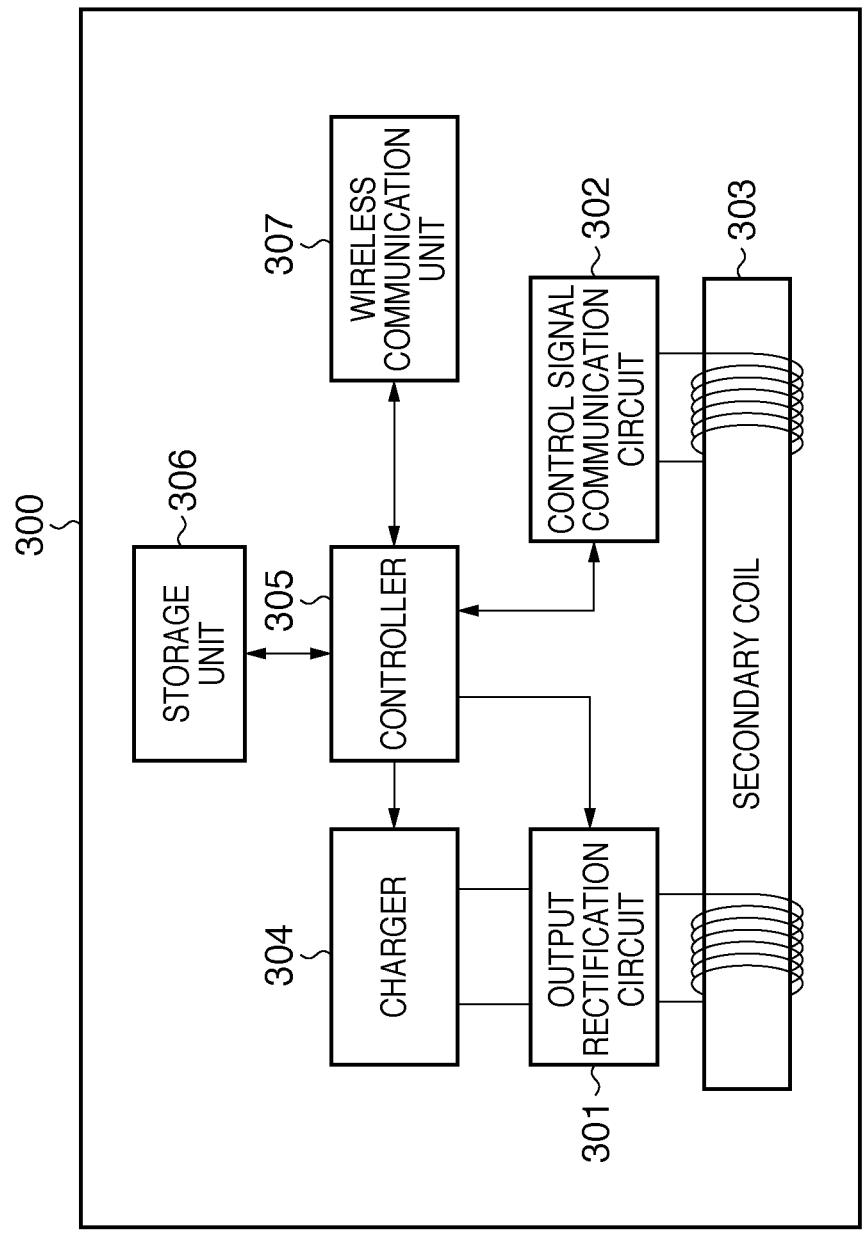
FIG. 3 is a block diagram showing the internal configuration of a power-supplied device.

FIG. 3 is a block diagram showing the internal configuration of a power-supplied device 300 such as the external device 107 as a power supply target placed close to the power-supplying device 100. As shown in FIG. 3, the power-supplied device 300 includes an output rectification circuit 301, control signal communication circuit 302, secondary coil 303, charger 304, controller 305, storage unit 306, and wireless communication unit 307.

The output rectification circuit 301 rectifies an electromotive force (alternating current) generated on the secondary coil 303 by the variation of the oscillating magnetic flux supplied from the power-supplying device 100 into a DC electromotive force, and transmits DC power for charging to the charger 304.

The control signal communication circuit 302 analyzes the electromotive force generated on the secondary coil 303 by the oscillating magnetic flux for signal communication generated on the primary coil 204 of the power-supplying device 100, and acquires information for control signal communication. More specifically, the control signal communication circuit 302 detects the change pattern (electromotive force pattern) of the electromotive force generated on the secondary coil 303 in accordance with the oscillating magnetic flux for signal communication transmitted from the power-supplying device 100. Also, in response to instructions from the controller 305, the control signal communication circuit 302 generates an oscillating magnetic flux for signal communication on the secondary coil 303, thereby transmitting a signal to the power-supplying device 100.

For example, the control signal communication circuit 302 of the power-supplied device 300 and the control signal communication circuit 203 of the power-supplying device 100 can perform information communication between the power-supplying device 100 and power-supplied device 300 by using a predetermined magnetic flux variation pattern. More specifically, when the control signal communication circuit on the transmitting side generates a magnetic flux whose period has a predetermined pattern on the coil, the coil on the receiving side generates an electromotive force pattern corresponding to the oscillating magnetic flux. The control signal communication circuit on the receiving side can acquire information transmitted from the transmitting side by detecting this electromotive force pattern. Thus, information communication between the power-supplying device and power-supplied device can be performed by exchanging the predetermined magnetic flux variation pattern based on a predetermined protocol.

The secondary coil 303 receives a variation of magnetic flux generated on the primary coil 204 of the power-supplying device 100, and generates an electromotive force. Also, the secondary coil 303 can generate an oscillating magnetic flux for signal communication under the control of the control signal communication circuit 302.

The charger 304 charges an internal battery (not shown) by using the DC power for charging supplied from the output rectification circuit 301.

The controller 305 is, for example, a CPU or microcomputer, and controls the individual units of the power-supplied device 300 by sequentially executing program codes stored in the storage unit 306 or the like. More specifically, the controller 305 controls the output rectification circuit 301, control signal communication circuit 302, charger 304, and wireless communication unit 307.

The storage unit 306 stores, for example, the program codes to be executed by the controller 305, and the setting information of the power-supplied device 300. The storage unit 306 also provides a work area where the controller 305 executes the program codes. For example, the work area of the storage unit 306 stores data packets for wireless communication using the wireless communication unit 307.

The wireless communication unit 307 wirelessly communicates with another device such as the power-supplying device 100 under the control of the controller 305. Although the wireless communication method is not particularly limited as in the wireless communication unit 208 described previously, this embodiment uses a wireless LAN complying with the IEEE802.11 standards.

The procedure of processing performed by the power-supplying device 100 according to this embodiment when starting power supply to a power-supplied device placed (within a power supply range) close to the power-supplying device 100 will be explained with reference to FIG. 4.

Figure 4:
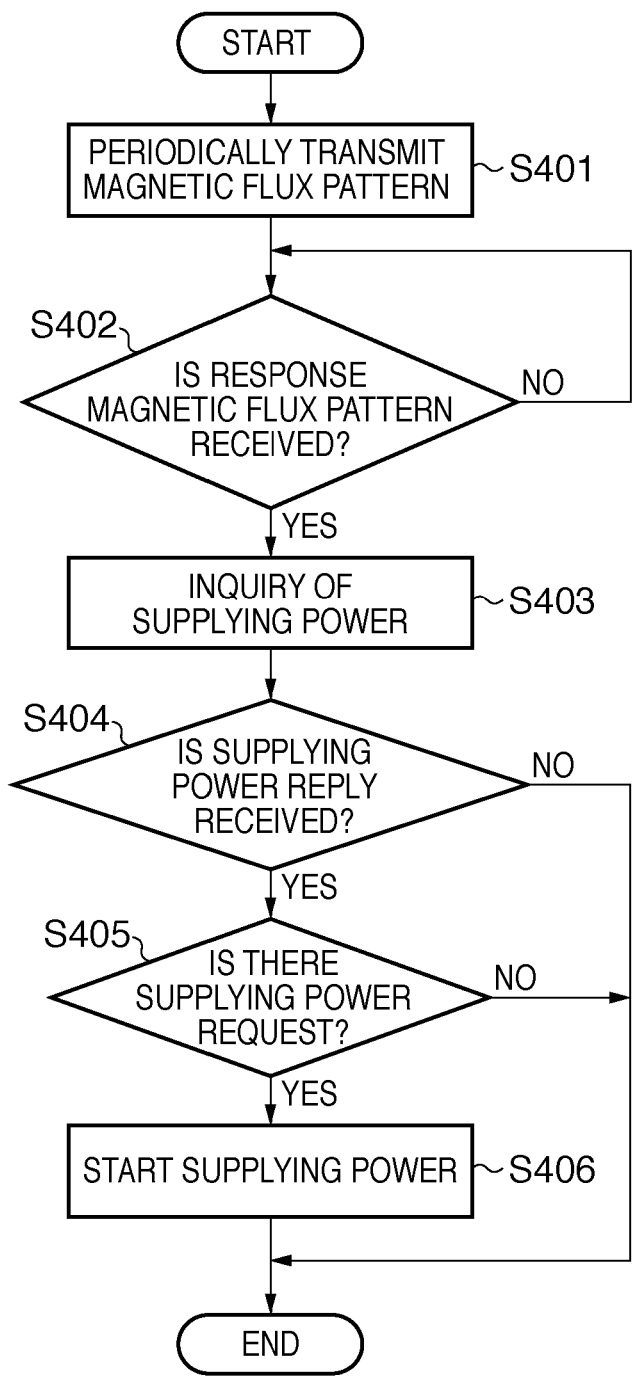
FIG. 4 is a flowchart showing processing performed by the power-supplying device according to the embodiment when starting power supply to the power-supplied device.

As shown in FIG. 4, when the processing is started, the controller 205 controls the control signal communication circuit 203 to cause the primary coil 204 to generate a variation of magnetic flux having a predetermined pattern for checking the existence of a power-supplied device (S401). In other words, the controller 205 causes the primary coil 204 to generate an oscillating magnetic flux by superposing a check signal for determining whether a power-supplied device is placed within the power supply range. This variation of magnetic flux is transmitted perpendicularly to, for example, the platform (e.g., the upper surface of the main body 103) of the power-supplying device 100. Note that this variation of magnetic flux is not for power supply (power transmission) but for signal communication. Therefore, the power-supplying device 100 generates a weak oscillating magnetic flux at low power in step S401.

Figure 5:
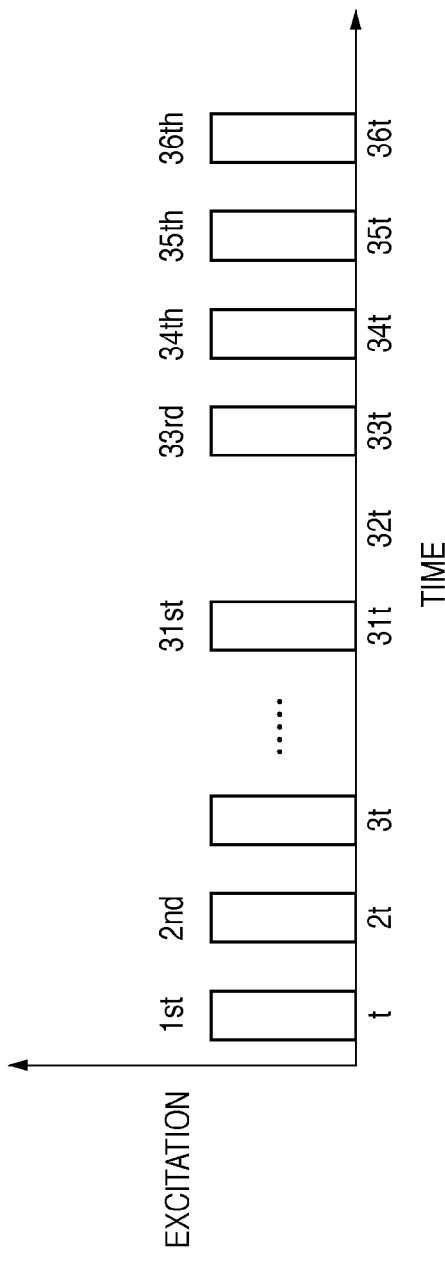
FIG. 5 is a graph showing an example of a variation of magnetic flux having a predetermined pattern.

FIG. 5 is a graph showing an example of the variation of magnetic flux having the predetermined pattern generated on the primary coil 204 in step S401. The example shown in FIG. 5 is a variation of magnetic flux having a pattern in which after excitation successively occurs 31 times at a predetermined interval (time t), no 32nd excitation occurs, and excitation occurs four times at the predetermined interval after that.

In step S401, the controller 205 controls the control signal communication circuit 203 to cause the primary coil 204 to generate the variation of magnetic flux as shown in FIG. 5. When the power-supplied device 300 is set on the table of the power-supplying device 100, the secondary coil 303 of the power-supplied device 300 generates an electromotive force corresponding the variation of magnetic flux having the predetermined pattern. The control signal communication circuit 302 detects the electromotive force generated on the secondary coil 303. When the power-supplied device 300 is a power-supplied device corresponding to the power-supplying device 100, the controller 305 controls the control signal communication circuit 302 to cause the secondary coil 303 to generate an oscillating magnetic flux by superposing a response signal for the power-supplying device 100. The response signal is a variation of magnetic flux having a response pattern corresponding to the above-mentioned magnetic flux variation for checking the existence of the power-supplied device. The control signal communication circuit 203 detects the electromotive force generated on the primary coil 204 by using this oscillating magnetic flux having the response pattern generated by the secondary coil 303, and transmits the detected signal to the controller 205. The controller 205 determines whether the detected signal corresponds to the response pattern (S402).

Figure 6:
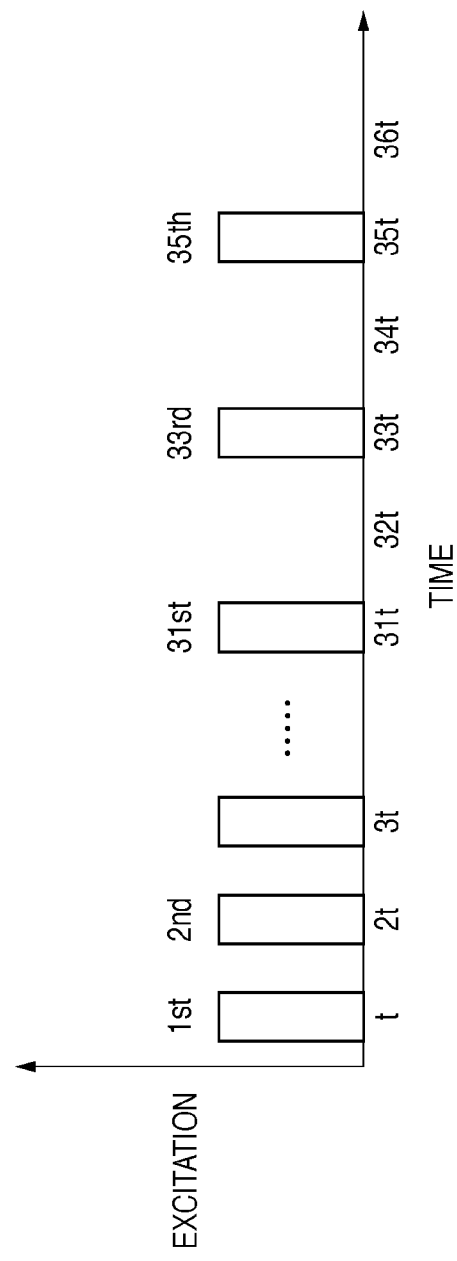
FIG. 6 is a graph showing an example of a variation of magnetic flux having a response pattern.

FIG. 6 is a graph showing an example of the variation of magnetic flux having the response pattern generated on the secondary coil 303 of the power-supplied device 300. The example shown in FIG. 6 is a variation of magnetic flux having a response pattern in which after excitation successively occurs 31 times at a predetermined interval (time t), no 32nd excitation occurs, and excitation intermittently occurs twice (at an interval of 2t). When detecting the variation of magnetic flux having the predetermined pattern generated by the primary coil 204 of the power-supplying device 100, the controller 305 of the power-supplied device 300 controls the control signal communication circuit 302 to cause the secondary coil 303 to generate the variation of magnetic flux having the response pattern as shown in FIG. 6.

Note that if no external device exists in the power supply range of the power-supplying device 100 or if an external device placed in the power supply range of the power-supplying device 100 does not correspond to the power-supplying device 100, the control signal communication circuit 203 does not receive the variation of magnetic flux having the response pattern. In this case, the control signal communication circuit 203 of the power-supplying device 100 keeps generating, on the primary coil 204, the variation of magnetic flux having the predetermined pattern for checking the existence of a power-supplied device, under the control of the controller 205. Note that this variation of magnetic flux is weak, and the interval of the generated pattern is wide. Even when a metal or the like is placed on the table, therefore, this metal or the like does not generate much heat.

If the controller 205 of the power-supplying device 100 determines that the control signal communication circuit 203 has detected the response pattern (YES in S402), the controller 205 inquires of the power-supplied device 300 placed in the power supply range whether power supply is necessary (S403). More specifically, in step S403, the control signal communication circuit 203 causes the primary coil 204 to generate a variation of magnetic flux having a pattern indicating the power supply inquiry under the control of the controller 205, as in step S401.

Note that the controller 205 controls the control signal communication circuit 203 to cause the primary coil 204 to periodically generate the variation of magnetic flux having the predetermined pattern for checking the existence of the power-supplied device 300 even after step S403, and changes the generation interval (increases the interval) after step S403. That is, after the variation of magnetic flux having the response pattern is received from the secondary coil 303 of the power-supplied device 300, the controller 205 uses the variation of magnetic flux having the predetermined pattern generated on the primary coil 204 to determine whether the power-supplied device 300 is removed from the power supply range of the power-supplying device 100. The generation interval of the variation of magnetic flux having the predetermined pattern for checking the existence of the power-supplied device 300 is increased after step S403 in order to perform another communication (signal communication such as the inquiry about the necessity of power supply) between the power-supplying device 100 and power-supplied device 300.

An operation after the power-supplied device 300 is inquired of whether power supply is necessary in step S403 will be explained below. The controller 205 waits until the control signal communication circuit 203 detects the response pattern of the variation of magnetic flux which is generated by the secondary coil 303 of the power-supplied device 300, and on which the information indicating the necessity of power supply is superposed (S404). The control signal communication circuit 203 detects the electromotive force generated on the primary coil 204 by the oscillating magnetic flux having the response pattern, and notifies the controller 205 of the reception of the response pattern. If the controller 205 determines that the response pattern of the variation of magnetic flux on which the information indicating the necessity of power supply (indicating a power supply request) is received (YES in S405), the controller 205 drives the resonance circuit 202 and causes the primary coil 204 to generate an oscillating magnetic flux for power supply, thereby starting non-contact power supply to the power-supplied device 300 (S406).

Figure 7:
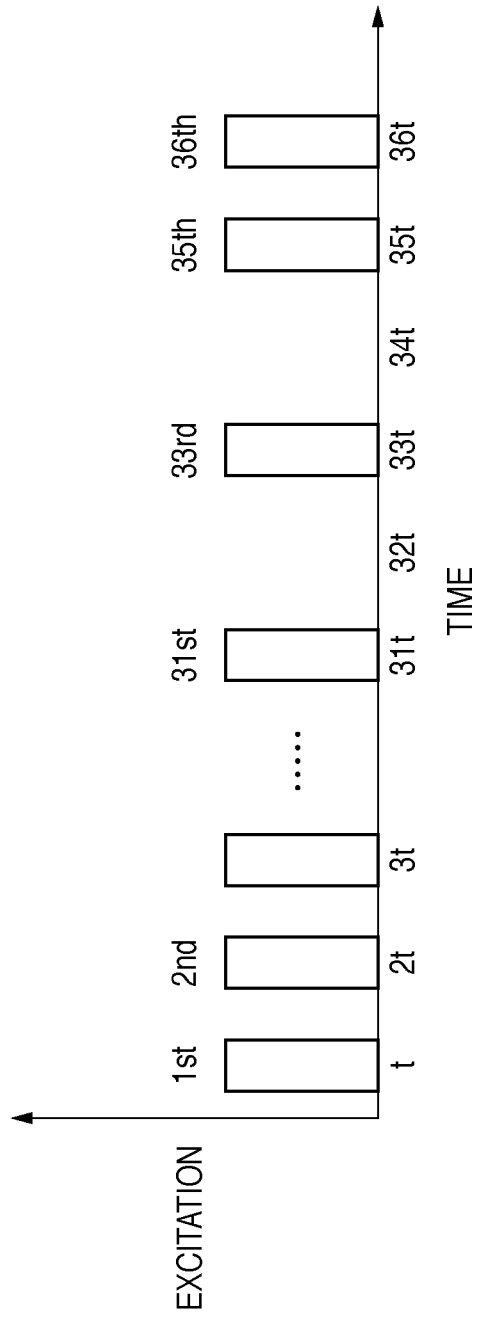
FIG. 7 is a graph showing an example of a variation of magnetic flux having a pattern indicating a power supply request.

FIG. 7 is a graph showing an example of the variation of magnetic flux having the pattern indicating the power supply request. This example shown in FIG. 7 is a variation of magnetic flux having a response pattern in which after excitation successively occurs 31 times at a predetermined interval (time t), 33rd excitation occurs (there is neither 32nd excitation nor 34th excitation), and 35th excitation and 36th excitation successively occur. The control signal communication circuit 302 of the power-supplied device 300 generates the variation of magnetic flux as shown in FIG. 7 as the pattern indicating the power supply request under the control of the controller 305.

Note that if the control signal communication circuit 203 detects no power supply request from the power-supplied device 300 (NO in S405), the processing is immediately terminated. If there is no more power supply request from the power-supplied device 300 after the non-contact power supply is started (S406), the controller 205 controls the resonance circuit 202 to generate no oscillating magnetic flux for power supply from the primary coil 204.

The procedure of processing performed by detecting whether the power-supplied device 300 has carried away from the power supply range of the power-supplying device 100 according to this embodiment will be explained below with reference to FIG. 8.

Figure 8:
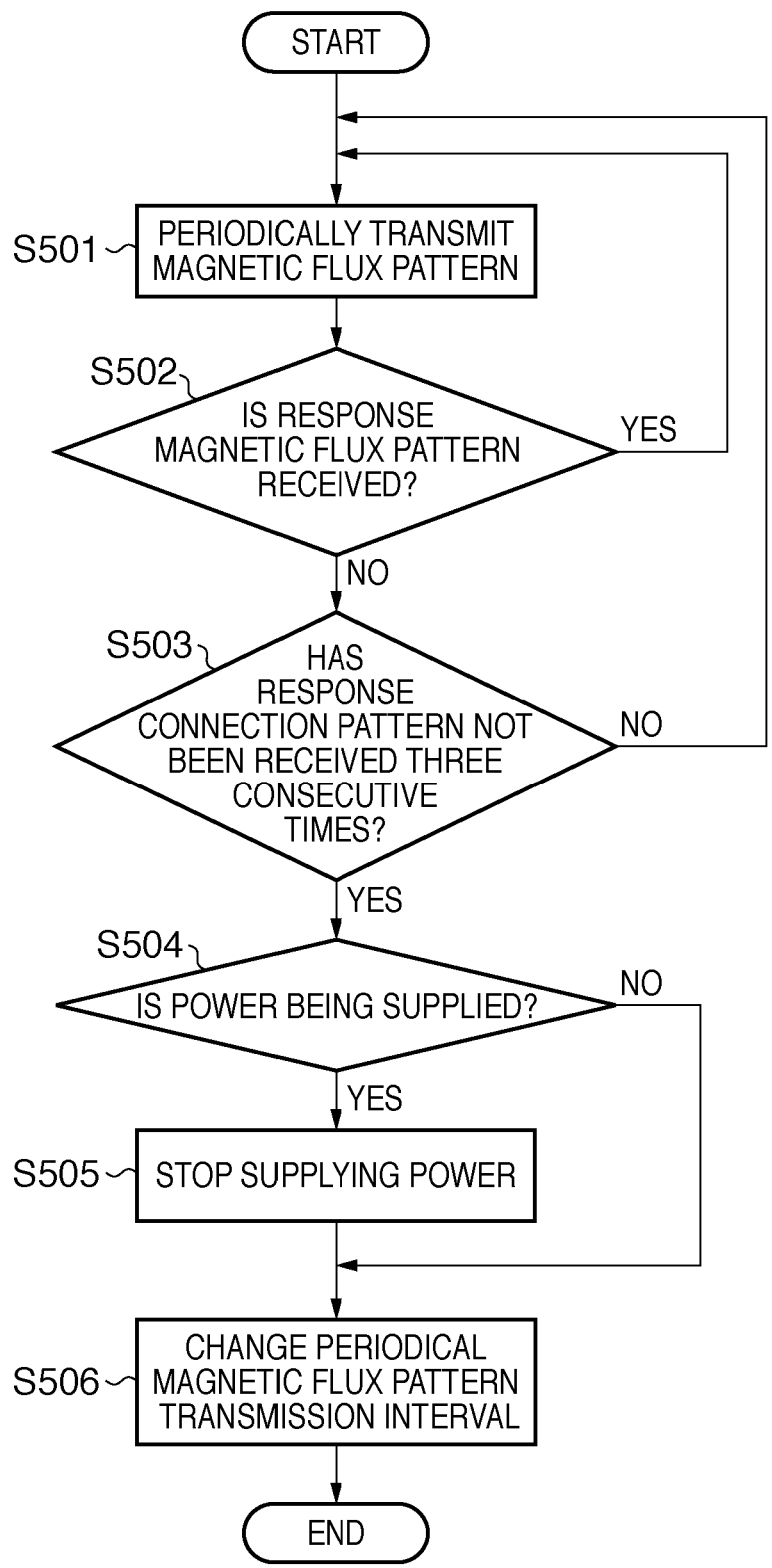
FIG. 8 is a flowchart showing processing performed when the power-supplying device according to the embodiment detects the removal of the power-supplied device.

As shown in FIG. 8, as described previously, the controller 205 controls the control signal communication circuit 203 to cause the primary coil 204 to generate the variation of magnetic flux having the predetermined pattern for checking the existence of the power-supplied device 300 at a predetermined interval (S501). As described above, if the control signal communication circuit 203 detects the electromotive force generated on the primary coil 204 by the oscillating magnetic flux having the response pattern generated by the secondary coil 303 of the power-supplied device 300, the controller 205 determines that the response pattern is received. When receiving the response pattern from the power-supplied device 300 (YES in S502), the controller 205 returns the process to step S501. That is, the controller 205 periodically determines whether the power-supplied device 300 exists on the table by performing the processing in steps S501 and S502.

Also, if the variation of magnetic flux having the response pattern generated by the secondary coil 303 of the power-supplied device 300 cannot be received even when a maximum waiting time determined by the protocol has elapsed after the control signal communication circuit 203 causes the primary coil 204 to generate the variation of magnetic flux having the predetermined pattern (NO in S502), the controller 205 determines whether the variation of magnetic flux having the response pattern cannot be detected three consecutive times (S503). If the variation of magnetic flux having the response pattern from the power-supplied device 300 can be received within three consecutive times (NO in S503), the controller 205 returns the process to the sequence at the start.

If the variation of magnetic flux having the response pattern from the power-supplied device 300 cannot be received three consecutive times (YES in S503), the controller 205 determines that the power-supplied device 300 does not exist within the power supply range of the power-supplying device 100, and determines whether non-contact power supply has been performed for the power-supplied device 300 (S504). That is, the controller 205 determines whether power is being supplied by controlling the resonance circuit 202 to cause the primary coil 204 to generate the oscillating magnetic flux for power supply. If non-contact power is being supplied for the power-supplied device 300, the controller 205 controls the resonance circuit 202 to cause the primary coil 204 to generate no oscillating magnetic flux for power supply (S505).

Then, the controller 205 controls the control signal communication circuit 203 to decrease the interval at which the primary coil 204 generates the variation of magnetic flux having the predetermined pattern for checking the existence of the power-supplied device (S506). More specifically, in step S506, the controller 205 decreases the generation interval of the variation of magnetic flux having the predetermined pattern in the control signal communication circuit 203, thereby returning the generation interval for rechecking the existence of the power-supplied device 300 to the generation interval when no power-supplied device 300 is confirmed.

The procedure of processing when power supply is started while the power-supplying device 100 according to this embodiment is wirelessly communicating with the power-supplied device 300 as an external device will be explained with reference to FIG. 9.

Figure 9:
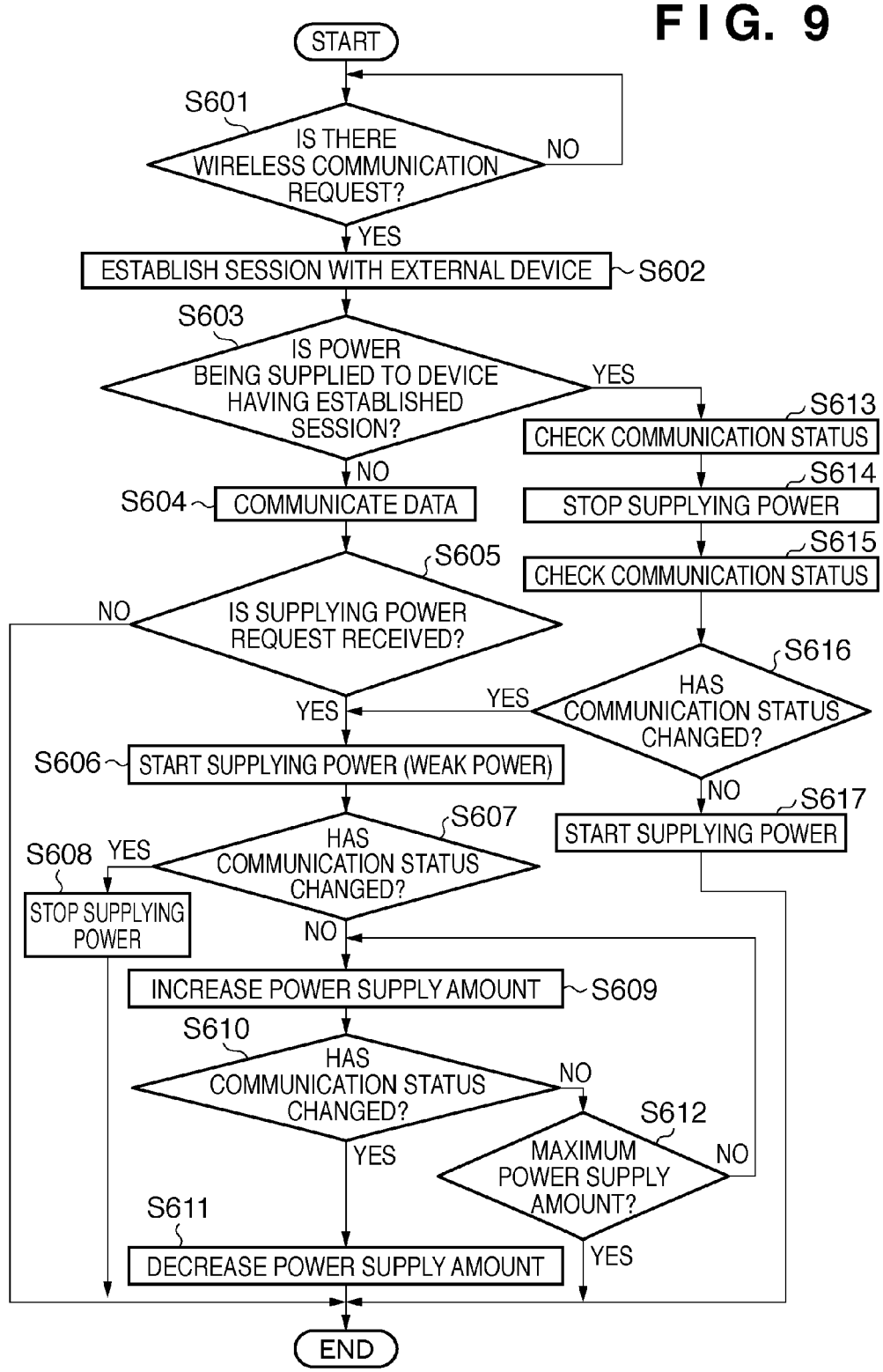
FIG. 9 is a flowchart showing processing by which the power-supplying device according to the embodiment supplies power while the power-supplying device is wirelessly communicating with an external device.

When the processing is started as shown in FIG. 9, the controller 205 performs connection inquiry for requesting the connection of wireless communication with respect to the external device by using the wireless communication unit 208 (S601). Note that this embodiment uses normal wireless LAN connection in the wireless communication between the power-supplying device 100 and external device.

In this connection inquiry, as in a normal wireless LAN, the wireless communication unit 208 periodically transmits a beacon packet to the surroundings under the control of the controller 205. For example, the controller 305 of the power-supplied device 300 having received the beacon attempts to establish a communication session with the power-supplying device 100 by using the wireless communication unit 307, based on an ESSID preset in the beacon. If the ESSID from the external device matches an ESSID set in the power-supplying device 100, the communication session between the power-supplying device 100 and external device is established, and wireless communication can be performed after that (S602).

Then, the controller 205 determines whether power is being supplied to the external device with which the communication session has been established (S603). The procedure of processing concerning the method of determining whether power is being supplied to the external device with which the communication session has been established will be explained below with reference to FIG. 10.

Figure 10:
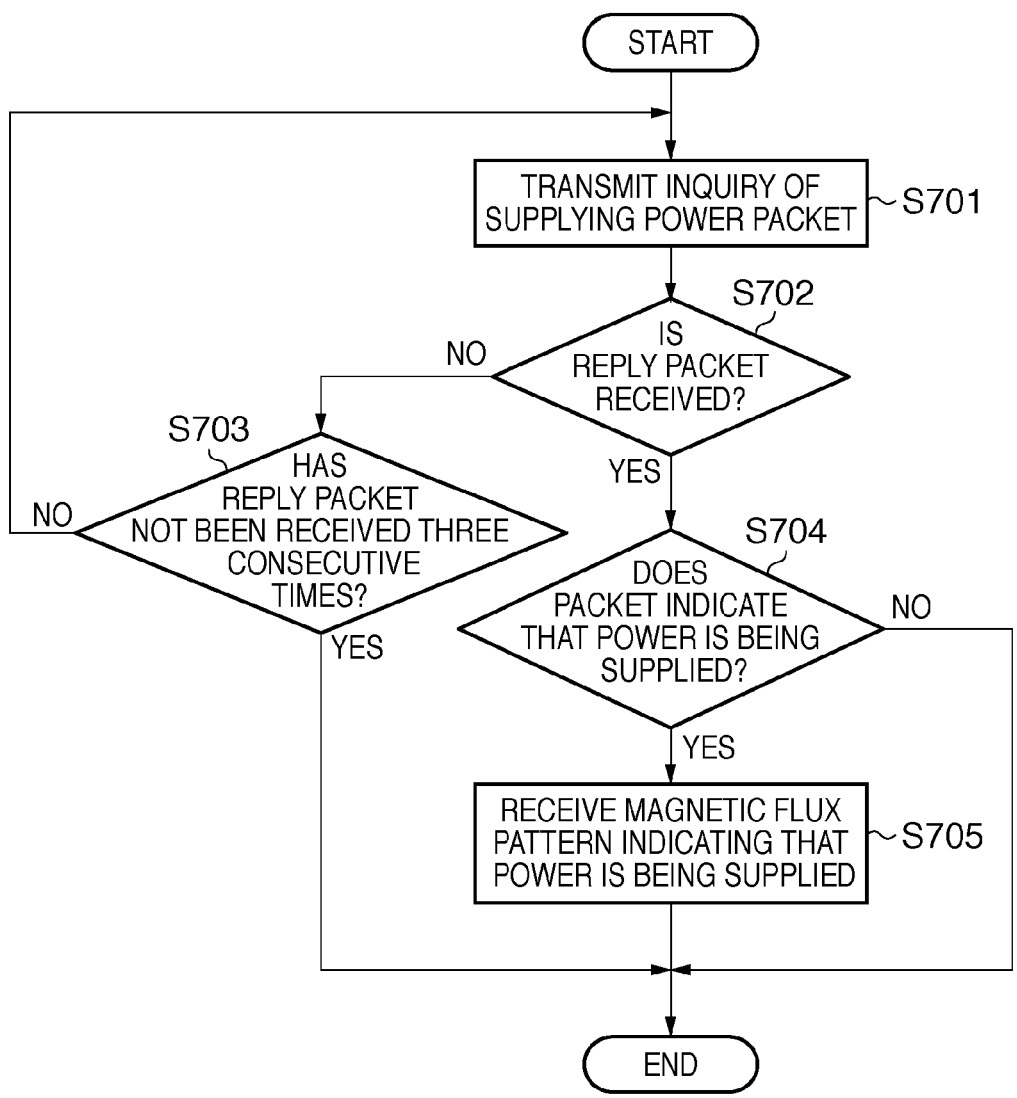
FIG. 10 is a flowchart showing processing by which the power-supplying device according to the embodiment determines whether power is being supplied an external device with which a communication session has been established.

As shown in FIG. 10, the controller 205 causes the wireless communication unit 208 to transmit, to the external device with which the communication session has been established, a communication packet for requesting the external device to generate, from the secondary coil 303, a variation of magnetic flux having a pattern indicating that power is being supplied (S701). If the external device with which the communication session has been established is the power-supplied device 300, a reply packet indicating that power is being supplied is returned by wireless communication from the wireless communication unit 307 to the wireless communication unit 208 of the power-supplying device 100. Also, under the control of the controller 305, the control signal communication circuit 302 causes the secondary coil 303 to generate a variation of magnetic flux having a pattern indicating that power is being supplied.

Subsequently, the controller 205 determines whether the wireless communication unit 208 has received the reply packet from the external device (S702). If the wireless communication unit 208 has received the reply packet from the external device (YES in S702), the controller 205 determines whether the received reply packet is a communication packet indicating that power is being supplied (S704).

If the reply packet received in step S704 is the communication packet indicating that power is being supplied, the controller 205 waits until the secondary coil of the external device generates a variation of magnetic flux having a pattern indicating that power is being supplied and the control signal communication circuit 203 receives the variation of magnetic flux (S705). After that, when the control signal communication circuit 203 detects a change in electromotive force generated on the primary coil 204 by the variation of magnetic flux transmitted from the external device and having the pattern indicating that power is being supplied, the controller 205 performs the following processing. The controller 205 determines that the external device as a present wireless communication partner is the power-supplied device 300, and that power is being supplied by the oscillating magnetic flux for power supply generated on the primary coil 204 of the power-supplying device 100. Note that the variation of magnetic flux having the pattern indicating that power is being supplied is detected in order to allow the controller 205 to know a power-supplied device as a present wireless communication partner when, for example, the power-supplying device 100 includes a plurality of power supply units such as the primary coils 204 and there are a plurality of power-supplied units to which power is being supplied.

If no reply packet can be received from the external device (NO in S702) after the wireless communication unit 208 has transmitted the communication packet requesting the generation of the variation of magnetic flux having the pattern indicating that power is being supplied (S701), the controller 205 determines whether no reply packet has been received three times (S703). If the number of times of the non-reception of the reply packet is less than three, the controller 205 returns the process to step S701, and causes the wireless communication unit 208 to retransmit the communication packet requesting the generation of the variation of magnetic flux having the pattern indicating that power is being supplied. If no reply packet can be received three times, the controller 205 determines that no power is being supplied to the external device as a present communication partner and the external device is not a power-supplied device corresponding to the power-supplying device 100, and terminates the processing.

If the reply packet received by the wireless communication unit 208 is a communication packet indicating that no power is being supplied (NO in S704), the controller 205 determines that no power is being supplied to the external device as a present communication partner, and terminates the processing.

The rest of the processing will be explained below with reference to FIG. 9 again. If no power is being supplied to the external device with which the communication session has been established (NO in S603), the controller 205 performs data communication using wireless LAN communication between the power-supplying device 100 and external device via the wireless communication unit 208 (S604). The controller 205 then determines, during the wireless LAN data communication, whether the control signal communication circuit 203 has received a variation of magnetic flux having a pattern indicating a power supply request from the external device (S605). If the variation of magnetic flux having the pattern indicating the power supply request has not been received from the external device (NO in S605), the controller 205 continues the normal wireless LAN communication. Note that while this wireless LAN communication is continued, the controller 205 periodically performs the processing in step S605, thereby determining whether the control signal communication circuit 203 has received the variation of magnetic flux having the pattern indicating the power supply request from the external device.

If the control signal communication circuit 203 has received the variation of magnetic flux having the pattern indicating the power supply request from the external device during the wireless LAN data communication (YES in S605), the controller 205 drives the resonance circuit 202 to start non-contact power supply to the power-supplied device 300 as the external device with a weak power (a first power lower than a predetermined electromotive force) (S606). That is, the controller 205 controls the resonance circuit 202 to cause the primary coil 204 to generate an oscillating magnetic flux for power supply, thereby generating an electromotive force on the secondary coil 303 of the power-supplied device 300. In step S606, the controller 205 initially controls the resonance circuit 202 to generate a small electromotive force (a first electromotive force) on the secondary coil 303 of the power-supplied device 300. Subsequently, the controller 205 detects the reduction in transfer rate of data currently being communicated by the wireless communication unit 208, and determines whether the wireless communication status has changed from the start of power supply to the power-supplied device 300 (S607).

When wireless LAN communication is performed between the power-supplying device 100 and external device, a communication detection method of detecting the reduction in data transfer rate, that is, the difference between the communication rates uses FCS (Frame Check Sequence) in a wireless LAN frame shown in FIG. 11. FIG. 11 is a view showing the frame configuration of a wireless LAN. As shown in FIG. 11, the wireless LAN frame includes a PLCP preamble 1101, PLCP header 1102, MAC header 1103, data 1104, and FCS 1105. The data 1104 includes frame control 1106, time/ID 1107, addresses 1108, 1109, 1110, and 1112, and sequence control 1111.

The controller 205 calculates the error rate of the FCS 1105, and compares the error rates before and after the start of power supply in step S607. If the difference between the error rates of the FCS 1105 before and after the start of power supply has exceeded a predetermined value, the controller 205 determines that the magnetic field generated by the power supply operation is affecting wireless communication (YES in S607), and controls the resonance circuit 202 to stop generating the oscillating magnetic flux for power supply, thereby stopping the supply of power (S608). That is, the controller 205 detects the difference between the communication rates before and during the power supply from the reduction in data transfer rate, and supplies power to the power-supplied device 300 so as to decrease the communication rate difference based on the detection result.

Also, when communication is performed not only to a wireless LAN but also to a wide area network via the network interface 207, the controller 205 includes an Ethernet frame in the detection of the transfer rate reduction. More specifically, the controller 205 determines whether the magnetic field generated by the power supply operation is affecting the communication of the wide area network by using CRC (Cyclic Redundancy Check) defined by an Ethernet frame shown in FIG. 12.

FIG. 12 is a view showing the frame configuration of the Ethernet. As shown in FIG. 12, the Ethernet frame includes a preamble 1201, SFD 1202, destination address 1203, transmission source address 1204, packet length 1205, data 1206, and CRC 1207. In wide area network communication using the Ethernet, the error rate is calculated for each frame by using the CRC 1207.

Accordingly, as in wireless LAN communication, the controller 205 determines whether the magnetic field generated by the power supply operation is affecting the wide area network communication by using the difference between the error rates of the CRC 1207 before and after the start of power supply. If the magnetic field generated by the power supply operation is affecting the wide area network communication (YES in S607), the controller 205 controls the resonance circuit 202 to stop generating the oscillating magnetic flux for power supply from the primary coil 204, thereby stopping the non-contact power supply (S608). After the data communication is completed, the controller 205 resumes the non-contact power supply.

If the communication status has not changed (NO in S607) after the start of power supply (S606), the controller 205 controls the resonance circuit 202 to increase the power supply amount per unit time by a preset predetermined amount (S609). That is, the controller 205 controls the resonance circuit 202 to gradually increase the power amount to be supplied to the primary coil 204, thereby increasing, by a predetermined amount, the amount of electromotive force generated on the secondary coil 303 of the power-supplied device 300 by the oscillating magnetic flux generated from the primary coil 204. Then, in the same manner as in step S607, the controller 205 determines whether the communication status has changed after the power supply amount per unit times is increased (S610). That is, based on the data transfer rate (error rate) in the wireless communication unit 208, the controller 205 determines whether the difference between the data communication rates before and after the power amount is gradually increased has exceeded a preset threshold value (or falls within a set range).

If the communication status has changed and the error rate has exceeded the preset certain threshold value in step S610, the controller 205 controls the resonance circuit 202 to decrease the power supply amount increased in step S609, thereby reducing the amount of electromotive force generated on the secondary coil 303 of the power-supplied device 300 by the oscillating magnetic flux generated on the primary coil 204 (S611), and continuing the communication and power supply. On the other hand, if the communication status has not changed and the error rate has not exceeded the preset certain threshold value in step S610, the controller 205 determines whether the present power supply amount per unit time is a preset maximum value (S612).

If the present power supply amount per unit time is the maximum value (YES in S612), the controller 205 controls the wireless communication unit 208 and resonance circuit 202 to continue the wireless communication and non-contact power supply. If the present power supply amount per unit time is not the maximum value (NO in S612), the controller 205 returns the process to step S609, and controls the resonance circuit 202 to increase the power supply amount again. By this process of gradually increasing the power supply amount (the power amount to be supplied to the primary coil), the controller 205 can set the upper-limit power supply amount by which the difference between the communication rates (error rates) before and during power supply falls within the preset range. Note that when the power amount to be supplied to the primary coil 204 increases, the electromotive force generated on the secondary coil 303 of the power-supplied device 300 also increases.

An operation when power is being supplied to the external device having established the communication session (YES in S603) will be explained below. If non-contact power is being supplied for the power-supplied device 300 as the external device having established the communication session, the controller 205 first checks the present communication status of the wireless communication unit 208 in the same manner as in step S607 or S610 (S613).

Subsequently, the controller 205 controls the resonance circuit 202 not to generate oscillating magnetic flux on the primary coil 204, in order to temporarily stop supplying power to the external device (S614), and rechecks the communication status of the wireless communication unit 208 with power supply being stopped (S615). The controller 205 then determines whether the communication error rate has exceeded the preset certain threshold value in data communication by the wireless communication unit 208 before and after power supply (S616). If the communication error rate has exceeded the certain threshold value in step S616, the controller 205 advances the process to step S606, and controls the resonance circuit 202 to generate a weak oscillating magnetic flux on the primary coil 204 in order to start supplying weak power. After that, the controller 205 performs the same operation in steps S607 to S612.

If the communication error rate has not exceeded the certain threshold value in step S616, the controller 205 controls the resonance circuit 202 to generate an oscillating magnetic flux on the primary coil 204 in order to resume the power supply temporarily stopped in step S614 (S617), thereby continuing the communication by the wireless communication unit 208 and the non-contact power supply.

Note that the method of increasing the power supply amount per unit time while detecting the communication error rate has been explained in this embodiment, but the control of the power supply amount is not limited to this. For example, it is also possible to increase or decrease the power supply amount in accordance with whether the communication error rate is higher or lower than the preset certain threshold value. In addition, it is possible to initially maximize the power supply amount per unit time, and decrease it while detecting the reduction in error rate. That is, power supply control can also be performed such that while the power amount to be supplied to the primary coil is gradually decreased, the power supply amount by which there is no more error rate reduction is set as an optimum power supply amount. By this gradual decreasing process, the controller 205 can also set the upper-limit power supply amount by which the difference between the communication rates in the wireless communication unit 208 or network interface 207 before and after power supply falls within the preset range. Note also that the example of non-contact power supply using an electromagnetic induction method has been explained in this embodiment, but the present invention can also be applied to a magnetic field resonance method (magnetic resonance method) or a radio wave transmission method. The magnetic field resonance method uses the principle by which when variations of an electric field and magnetic field having a predetermined cycle are generated on a primary coil, an electromotive force is generated on a circuit of a secondary coil whose resonance frequency is the predetermined period.

[Power Supply to Plurality of Power-Supplied Devices]

The procedure of processing when the power-supplying device 100 according to this embodiment starts wireless communication with an external device and supplies power to a plurality of power-supplied devices will be explained below with reference to FIG. 13. In this case, the power-supplying device 100 includes a plurality of primary coils each including a resonance circuit and control signal communication circuit, and can supply power to a plurality of power-supplied devices.

Figure 13:
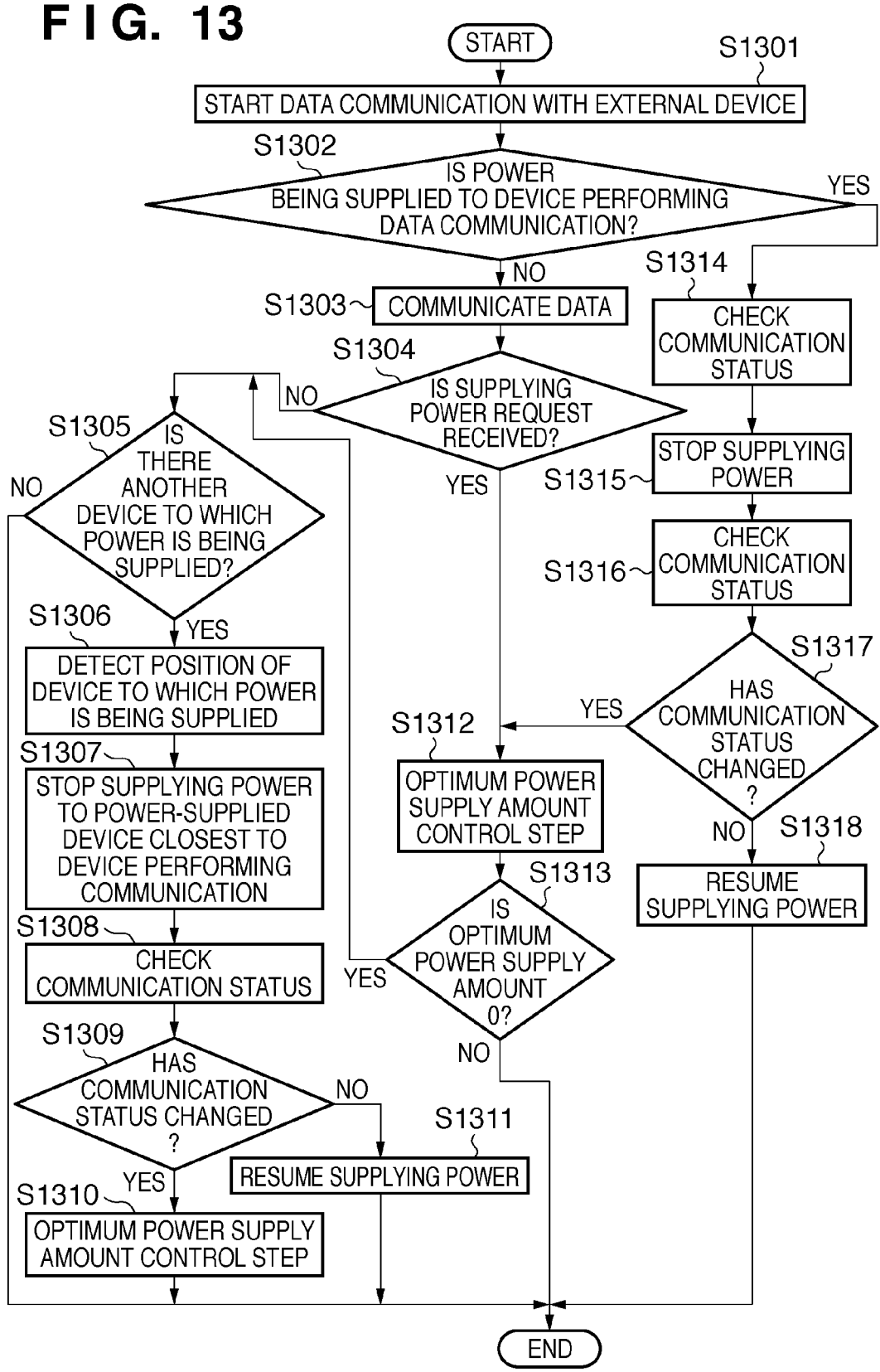
FIG. 13 is a flowchart showing processing by which the power-supplying device according to the embodiment supplies power to a plurality of power-supplied devices.

As shown in FIG. 13, when the processing is started, the controller 205 establishes a communication session with an external device via the wireless communication unit 208, and starts data transfer (S1301). The establishment of the communication session in step S1301 is the same as that in step S602 of FIG. 9, so a detailed explanation will be omitted.

Then, the controller 205 determines whether non-contact power supply is being executed for the power-supplied device 300 as the external device having established the communication session (S1302). If no non-contact power supply is being executed, the controller 205 controls the wireless communication unit 208 to continue the data communication (S1303), and determines whether the control signal communication circuit 203 has received a power supply start request from the power-supplied device 300 (S1304). Note that while the above-mentioned communication is continued, the controller 205 periodically performs the processing in step S1304 to determine whether the control signal communication circuit 203 has received the power supply start request from the power-supplied device 300.

If no power supply start request is received in step S1304, the controller 205 determines whether there is another external device for which non-contact power supply is being executed, that is, whether there is another power-supplied device to which power is being supplied (S1305).

If there is no other power-supplied device for which non-contact power supply is being executed in step S1305, the controller 205 terminates the process. If there is another power-supplied device for which non-contact power supply is being executed, the controller 205 detects, by a method to be described later, the position of the power-supplied device to which power is being supplied (S1306), and controls the resonance circuit 202 to stop supplying power to a power-supplied device which is closest to the external device having established the communication session and to which power is being supplied (S1307). Then, as in step S615 or the like, the controller 205 checks the change between the communication states of the wireless communication unit 208 before and after the power supply is stopped (S1308).

The power-supplied device position detection performed by the power-supplying device 100 will be explained below with reference to FIG. 14. FIG. 14 is a view showing an external device management table 1400 stored in the storage unit 206 of the power-supplying device 100. As shown in FIG. 14, the external device management table 1400 stores information concerning the presence/absence of a power-supplied device, the state of power supply, and the state of session establishment, for each of the plurality of primary coils 204 of the power-supplying device 100.

In the external device management table 1400, coil numbers are assigned in one-to-one correspondence with the positions of primary coils on the table of the main body 103, and the difference between the coil numbers indicates the distance. For example, a primary coil of coil number "3" or "5" is closest to a primary coil of coil number "4".

When the control signal communication circuit 203 of a certain primary coil 204 has received a predetermined variation of magnetic flux complying with the protocol, information corresponding to the primary coil 204 having received the variation of magnetic flux is updated in the external device management table 1400 in accordance with the pattern of the variation of magnetic flux. The external device management table 1400 thus manages the information of the power-supplied device for each primary coil 204. More specifically, when the control signal communication circuit 203 has received a variation of magnetic flux having a response pattern from a power-supplied device placed on the table of the main body 103, the controller 205 updates the information (the presence/absence of a power-supplied device) of the coil number corresponding to the primary coil having received the variation of magnetic flux. The state of power supply and the state of session establishment in the external device management table 1400 are similarly updated.

Accordingly, the controller 205 can detect the positional relationship between power-supplied devices including the information of the state of communication and the state of power supply by referring to the external device management table 1400, and can specify a power-supplied device closest to a power-supplied device having established the communication session. In the example shown in FIG. 14, a power-supplied device closest to the power-supplied device with coil number "4" having established the communication session is the power-supplied device with coil number "5" to which power is being supplied.

The rest of the process after step S1308 will be explained below with reference to FIG. 13 again. The controller 205 then determines whether the communication state of the wireless communication unit 208 has changed and the data transfer rate has increased (the error rate has decreased) (S1309). If the data transfer rate has increased, the controller 205 determines that power supply to a power-supplied device positioned closest to the external device having established the communication session is adversely affecting the communication, and performs the same processing as in steps S606 to S612 of FIG. 6 (S1310). More specifically, the controller 205 detects the data transfer rate (error rate) of the wireless communication unit 208 while controlling the resonance circuit 202 to gradually increase the amount of power supply to the power-supplied device, thereby setting a power supply amount that decreases the change in communication rate and reduces the effect on the transfer rate.

Accordingly, if power supply to the power-supplied device closest to the external device having established the communication session is adversely affecting the communication, the controller 205 can improve the communication with the external device by controlling the power supply amount. Also, if the data transfer rate (error rate) has exceeded the threshold value while the amount of power supply to the power-supplied device closest to the external device having established the communication session is minimum, the controller 205 may also control the resonance circuit 202 to completely stop the power supply to the closest power-supplied device, and control power supply to the next closest power-supplied device. Consequently, even when power supply to not only the power-supplied device closest to the external device presently performing communication but also the next closest power-supplied device is affecting the communication, the controller 205 can recover the data transfer rate (error rate) in the wireless communication unit 208.

If the communication status has not changed in step S1309 (NO in S1309), the controller 205 determines that power supply to the power-supplied device closest to the external device having established the communication session doesn't affect the communication, and controls the resonance circuit 202 to resume the power supply (S1311).

If a power supply start request is received from the external device in step S1304, the controller 205 performs an optimum power supply amount control process (S1312) in the same manner as in step S1310, thereby setting the amount of power supply to the external device to a power supply amount that reduces the effect on the data transfer rate. After the optimum power supply amount controlling process, the controller 205 determines whether the set optimum power supply amount is "0" (S1313).

If the set optimum power supply amount is "0" (i.e., if the power supply magnetic field of not only the external device presently performing communication but also another external device may cause the decrease in data transfer rate (the increase in error rate)), the controller 205 advances the process to step S1305. The controller 205 thus performs the processing in steps S1305 to S1311, thereby controlling power supply to the power-supplied device that is closest to the external device having established the communication session, and presumably affecting the data communication.

If power is being supplied to the external device having established the communication session in step S1302, the controller 205 checks the communication status of the wireless communication unit 208 (S1314), controls the resonance circuit 202 to temporarily stop the power supply to the external device (S1315), and rechecks the communication state (S1316). Subsequently, as in step S616, the controller 205 determines whether the communication state of the wireless communication unit 208 before the power supply has changed after that (S1317).

If the communication state before the power supply has not changed after that (NO in S1317), the controller 205 controls the resonance circuit 202 to immediately resume the temporarily stopped power supply to the external device (S1318), and continues the communication by the wireless communication unit 208 and the supply of power. If the communication status has changed (YES in S1317), the controller 205 advances the process to step S1312 to perform the optimum power supply amount control process, thereby setting the amount of power supply to the external device to a power supply amount that reduces the effect on the data transfer rate. If this optimum power supply amount set in step S1312 is "0", the controller 205 advances the process to step S1305 and performs the processing in steps S1305 to S1311. Thus, the power-supplying device 100 controls power supply to the power-supplied device that is closest to the external device having established the communication session, and presumably affecting the data communication.

By performing the above-mentioned process, the power-supplying device 100 controls power supply to not only an external device presently performing communication but also a power-supplied device closest to the external device presenting performing communication, by taking account of the data communication transfer rate (error rate). Accordingly, the power-supplying device 100 can avoid the increase in data communication error rate caused by the power supply, and maintain a good communication state.

In this embodiment, the amount of power supply to the power-supplied device is controlled by gradually increasing the power supply amount per unit time while detecting the decrease in data communication transfer rate (the increase in error rate). However, the power-supplying device may also control the amount of power supply to the power-supplied device by gradually decreasing the power supply amount per unit time while detecting the increase in data communication transfer rate. Also, if the transfer rate increases (the error rate decreases) during data communication, the reverse process of the sequence shown in FIG. 13 may also be performed. That is, power supply control of increasing the power supply amount per unit time until the error rate exceeds a predetermined threshold value may also be performed in order from a power-supplied device farthest from an external device presently performing communication to a power-supplied device closest to the external device. Furthermore, although the example of non-contact power supply using the electromagnetic induction method has been explained in this embodiment, the present invention can also be applied to, for example, the magnetic field resonance method (magnetic resonance method). The magnetic field resonance method uses the principle by which when a fluctuation of a magnetic field having a predetermined period is generated on a primary coil, an electromotive force is generated on a secondary coil of a power-supplied device whose resonance frequency is the predetermined period. That is, in the magnetic field resonance method, the amount of power supply to a power-supplied device can be controlled by controlling the amplitude of the fluctuation of a magnetic field generated from a power-supplying device.

Note that the description of the above-mentioned embodiment discloses an example, and the present invention is not limited to this. The arrangement and operation of the above embodiment can appropriately be changed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-117040, filed May 13, 2009, and No. 2010-104234, filed Apr. 28, 2010, which are hereby incorporated by reference herein in their entirety.

The invention claimed is:

1. A power-supplying device comprising:
a communicating unit configured to wirelessly communicate with a first external device;
a power supply unit configured to supply power to a power-supplied external device different from the first external device;
a detecting unit configured to detect an error rate occurred between the communicating unit and the first external device; and
a control unit configured to perform, based on whether a change of the error rate between the communicating unit and the first external device is more than a predetermined value, a process for controlling power supply to the power-supplied external device from the power supply unit if the power supply unit supplies power to the power-supplied external device wirelessly, wherein the communicating unit uses a communication path which is different from a path used for power supplying by the power supply unit.

2. The power supplying device according to claim 1, wherein the control unit performs a process for increasing power to be supplied from the power supply unit to the power-supplied external device if a change of the error rate is not more than the predetermined value.

3. The power supplying device according to claim 1, wherein the control unit is configured to determine whether a position of the first external device is near to a position of the power-supplied external device.

4. The power supplying device according to claim 1, wherein a change of the error rate is detected using an error rate detected before the power supply unit supplies power to the power-supplied external device and an error rate detected after the power supply unit supplies power to the power-supplied external device.

5. The power supplying device according to claim 1, wherein the power supply unit is configured to supply power to a plurality of external devices wirelessly, the plurality of external devices including the power-supplied external device.

6. A method comprising:
causing the power supplying device to communicate with a first external device wirelessly;
causing a power supplying device to supply power to a power-supplied external device different from the first external device;
detecting an error rate occurred between the power supplying device and the first external device; and
performing, based on whether a change of the error rate between the power supplying device and the first external device is more than a predetermined value, a process for controlling power supply to the power-supplied external device from the power supplying device if the power supplying device supplies power to the power-supplied external device wirelessly, wherein a wireless communication performed by the power supplying device uses a communication path which is different from a path used for power supplying by the power supplying device.

7. The method according to claim 6, further comprising performing a process for increasing power to be supplied from the power supplying device to the power-supplied external device if a change of the error rate is not more than the predetermined value.

8. The method according to claim 6, further comprising determining whether a position of the first external device is near to a position of the power-supplied external device.

9. The method according to claim 6, wherein a change of the error rate is detected using an error rate detected before the power supplying device supplies power to the power-supplied external device and an error rate detected after the power supplying device supplies power to the power-supplied external device.

10. The method according to claim 6, wherein the power supplying device is configured to supply power to a plurality of external devices wirelessly, the plurality of external devices including the power-supplied external device.

11. A power transmission device comprising:
a wireless communication unit that communicates with a first external device via a wireless communication path;
a wireless power transmission unit configured to transmit power to a power-supplied external device, different from the first external device, via a wireless power transmission path different from the wireless communication path; and
a control unit that (a) determines a state of communication between the wireless communication unit and the first external device when power is transmitted from the wireless power transmission unit to the power-supplied external device via the wireless power transmission path, and (b) controls power to be transmitted from the wireless power transmission unit to the power-supplied external device according to the determined state of communication between the wireless communication unit and the first external device.

12. The power transmission device according to claim 11, wherein the control unit uses a data transfer rate between the wireless communication unit and the first external device to determine a state of communication between the wireless communication unit and the first external device when power is transmitted from the wireless power transmission unit to the power-supplied external device via the wireless power transmission path.

13. The power transmission device according to claim 11, wherein the control unit uses an error rate occurred between the wireless communication unit and the first external device to determine a state of communication between the wireless communication unit and the first external device when power is transmitted from the wireless power transmission unit to the power-supplied external device via the wireless power transmission path.

14. The power transmission device according to claim 11, wherein the control unit uses errors occurred between the wireless communication unit and the first external device to determine a state of communication between the wireless communication unit and the first external device when power is transmitted from the wireless power transmission unit to the power-supplied external device via the wireless power transmission path.

15. The power transmission device according to claim 11, wherein the wireless power transmission unit is configured to use a coil to transmit power to the power-supplied external device.

16. The power transmission device according to claim 11, wherein the wireless power transmission unit is configured to use an electromagnetic induction to transmit power to the power-supplied external device.

17. The power transmission device according to claim 11, wherein the wireless power transmission unit is configured to use a magnetic field resonance or a magnetic resonance to transmit power to the power-supplied external device.

18. The power transmission device according to claim 11, wherein the wireless communication unit is configured to use a wireless network to communicate with the first external device.

19. The power transmission device according to claim 11, wherein the wireless power transmission unit is configured to use a coil to transmit power to the power-supplied external device via the wireless power transmission path, and the wireless communication unit is configured to use an antenna to communicate with the first external device via the wireless communication path.

20. The power transmission device according to claim 11, wherein the control unit is capable of determining whether a position of the first external device is near to a position of the power-supplied external device.

21. A method comprising:
causing a wireless communication unit to communicate with a first external device via a wireless communication path;
causing a wireless power transmission unit to transmit power to a power-supplied external device, different from the first external device, via a wireless power transmission path different from the wireless communication path;
determining a state of communication between the wireless communication unit and the first external device when power is transmitted from the wireless power transmission unit to the power-supplied external device via the wireless power transmission path; and
controlling power to be transmitted from the wireless power transmission unit to the power-supplied external device according to the determined state of communication between the wireless communication unit and the first external device.

22. The method according to claim 21, further comprising using a data transfer rate between the wireless communication unit and the first external device to determine a state of communication between the wireless communication unit and the first external device when power is transmitted from the wireless power transmission unit to the power-supplied external device via the wireless power transmission path.

23. The method according to claim 21, further comprising using an error rate occurred between the wireless communication unit and the first external device to determine a state of communication between the wireless communication unit and the first external device when power is transmitted from the wireless power transmission unit to the power-supplied external device via the wireless power transmission path.

24. The method according to claim 21, further comprising using errors occurred between the wireless communication unit and the first external device to determine a state of communication between the wireless communication unit and the first external device when power is transmitted from the wireless power transmission unit to the power-supplied external device via the wireless power transmission path.

25. The method according to claim 21, wherein the wireless power transmission unit is configured to use a coil to transmit power to the power-supplied external device.

26. The method according to claim 21, wherein the wireless power transmission unit is configured to use an electromagnetic induction to transmit power to the power-supplied external device.

27. The method according to claim 21, wherein the wireless power transmission unit is configured to use a magnetic field resonance or a magnetic resonance to transmit power to the power-supplied external device.

28. The method according to claim 21, wherein the wireless communication unit is configured to use a wireless network to communicate with the first external device.

29. The method according to claim 21, wherein the wireless power transmission unit is configured to use a coil to transmit power to the power-supplied external device via the wireless power transmission path, and the wireless communication unit is configured to use an antenna to communicate with the first external device via the wireless communication path.

30. The method according to claim 21, further comprising determining whether a position of the first external device is near to a position of the power-supplied external device.

31. A non-transitory storage medium that stores a program for causing a computer to execute a method, the method comprising:

causing a wireless communication unit to communicate with a first external device via a wireless communication path;

causing a wireless power transmission unit to transmit power to a power-supplied external device, different from the first external device, via a wireless power transmission path different from the wireless communication path;

determining a state of communication between the wireless communication unit and the first external device when power is transmitted from the wireless power transmission unit to the power-supplied external device via the wireless power transmission path; and controlling power to be transmitted from the wireless power transmission unit to the power-supplied external device according to the determined state of communication between the wireless communication unit and the first external device.

* * * * *